(12) United States Patent
Nakauma et al.

(10) Patent No.: US 9,259,021 B2
(45) Date of Patent: Feb. 16, 2016

(54) MODIFIED SUGAR BEET PECTIN AND METHOD FOR USING THE SAME

(75) Inventors: Makoto Nakauma, Toyonaka (JP); Sayaka Ishihara, Toyonaka (JP); Takahiro Funami, Toyonaka (JP)

(73) Assignee: SAN-EI GEN F.F.I., INC., Toyonaka-shi (JP)

( * ) Notice: Subject to any disclaimer, the term of this patent is extended or adjusted under 35 U.S.C. 154(b) by 531 days.

(21) Appl. No.: 13/144,186

(22) PCT Filed: Jan. 12, 2010

(86) PCT No.: PCT/JP2010/050243
§ 371 (c)(1),
(2), (4) Date: Jul. 12, 2011

(87) PCT Pub. No.: WO2010/082570
PCT Pub. Date: Jul. 22, 2010

(65) Prior Publication Data
US 2011/0274812 A1    Nov. 10, 2011

(30) Foreign Application Priority Data

Jan. 13, 2009  (JP) ................................ 2009-004754

(51) Int. Cl.
| | | |
|---|---|---|
| C08L 5/06 | (2006.01) | |
| A23L 1/0524 | (2006.01) | |
| A23L 1/035 | (2006.01) | |
| C08B 37/00 | (2006.01) | |

(52) U.S. Cl.
CPC .............. *A23L 1/0524* (2013.01); *A23L 1/035* (2013.01); *C08B 37/0045* (2013.01); *C08L 5/06* (2013.01); *Y10T 428/2982* (2015.01)

(58) Field of Classification Search
None
See application file for complete search history.

(56) References Cited

U.S. PATENT DOCUMENTS

| | | |
|---|---|---|
| 4,629,575 A | 12/1986 | Weibel |
| 4,831,127 A | 5/1989 | Weibel |
| 4,923,981 A | 5/1990 | Weibel |
| 5,008,254 A | 4/1991 | Weibel |
| 6,610,810 B2 | 8/2003 | Phillips |
| 6,841,644 B2 | 1/2005 | Phillips |
| 7,252,848 B2 | 8/2007 | Gelin |
| 2003/0027883 A1 | 2/2003 | Phillips |
| 2004/0059097 A1 | 3/2004 | Phillips |
| 2005/0048181 A1 | 3/2005 | Gelin |
| 2007/0160738 A1 | 7/2007 | Van Bokkelen |
| 2009/0087537 A1 | 4/2009 | Hiroe |
| 2009/0110799 A1 | 4/2009 | Funami |

FOREIGN PATENT DOCUMENTS

| | | |
|---|---|---|
| CN | 101218258 | 7/2008 |
| JP | 58-96010 | 6/1983 |
| JP | 3-197502 | 8/1991 |
| JP | 2000-139344 | 5/2000 |
| JP | 2004-536624 A1 | 12/2004 |
| JP | 2005-261430 A1 | 9/2005 |
| JP | 2005-525808 A1 | 9/2005 |
| JP | 2006-274226 A1 | 10/2006 |
| JP | 2006-274227 A1 | 10/2006 |
| WO | WO 2006/132288 A1 | 12/2006 |
| WO | WO 2007/037347 A1 | 4/2007 |
| WO | WO 2007/066233 A2 | 6/2007 |

OTHER PUBLICATIONS

English Translation JP 2006-274226.*
International Search Report for International Application No. PCT/JP2010/050243 dated Apr. 9, 2010.
Supplementary European Search Report mailed Feb. 28, 2013 in counterpart application No. EP 10 73 1239.
P.A. Williams et al.: "Elucidation of the Emulsification Properties of Sugar Beet Pectin", Journal of Agricultural and Food Chemistry, vol. 53, No. 9, May 1, 2005, pp. 3592-3597.

* cited by examiner

*Primary Examiner* — D. Lawrence Tarazano
*Assistant Examiner* — Stephanie Cox
(74) *Attorney, Agent, or Firm* — Kratz, Quintos & Hanson, LLP

(57) ABSTRACT

The present invention provides sugar beet pectin (modified sugar beet pectin) having improved or enhanced emulsifying properties and emulsion stability, compared to natural sugar beet pectin. Also provided is a method for producing the modified sugar beet pectin. The modified sugar beet pectin contains a water-insoluble component, and has a higher molecular weight after high-pressure homogenization than ordinary sugar beet pectin. The water-insoluble component absorbs water to form a hydrogel when the modified sugar beet pectin is dispersed in water at 25° C. to a final concentration of 0.1 mass %.

3 Claims, No Drawings

MODIFIED SUGAR BEET PECTIN AND METHOD FOR USING THE SAME

TECHNICAL FIELD

The present invention relates to modified sugar beet pectin, and a method for producing the same. More specifically, the invention relates to a modified sugar beet pectin that has improved or enhanced emulsifying properties, particularly emulsion stability, compared to natural sugar beet pectin; and a method for producing the modified sugar beet pectin. Further, the invention relates to use of the modified sugar beet pectin as an emulsifier; an emulsion (an emulsion composition) prepared using the modified sugar beet pectin, and a food or beverage prepared using the modified sugar beet pectin.

BACKGROUND ART

Sugar beet pectin is a natural high-molecular-weight polysaccharide derived from sugar beet (*Beta vulgaris* LINNE. var. *raga* DUMORTIER). Sugar beet pectin is composed of: a backbone of α-1,4-glycoside-linked poly-D-galactulonic acid; a side chain mainly comprising a neutral sugar, such as arabinose or galactose; and a proteinaceous moiety bound to the sugar chain. Sugar beet pectin has an average molecular weight of about 350,000 to about 550,000 g/ml, which corresponds to about 1.5 to 3 times the average molecular weight of ordinary citrus-derived pectin, and contains the side chain in a higher proportion than citrus-derived pectin. It is thus that sugar beet pectin is more nearly spherical than citrus-derived pectin. Furthermore, sugar beet pectin has a methyl esterification degree of 50% or more, and a total esterification degree of 85% or more, and is therefore categorized as a high methoxyl (HM) pectin.

Pectin is known to be used to prepare various emulsions (see, for example, Patent Literatures 1 to 3). However, when using citrus-derived pectin alone, whether it is a low methoxyl pectin or a high methoxyl pectin, sufficient emulsifying ability may not be exhibited. In contrast, sugar beet pectin has higher emulsifying ability than citrus-derived pectin, and can form an emulsion having a small particle diameter, even when used alone in a small amount.

However, it has been pointed out that emulsions prepared using sugar beet pectin do not always have good storage stability. To solve this problem, polymerization techniques that include a method of heating sugar beet pectin in the form of a powder (Patent Literatures 4 to 6), or a method of exposing sugar beet pectin to ionizing radiation in the presence of water (Patent Literature 7 to 9) have been reported. However, to use these methods, a special device that is usually not used in the production of sugar beet pectin must be used to control the temperature, humidity, etc. and problems such as insufficient emulsion stability improvement remain to be solved.

CITATION LIST

Patent Literature

PTL 1: Japanese Unexamined Patent Publication No. 1983-96010
PTL 2: Japanese Unexamined Patent Publication No. 2000-139344
PTL 3: Japanese Unexamined Patent Publication No. 2005-525808
PTL 4: Japanese Unexamined Patent Publication No. 2005-261430
PTL 5: WO 2006/132288 pamphlet
PTL 6: WO 2007/037347 pamphlet
PTL 7: Japanese Unexamined Patent Publication No. 2006-274226
PTL 8: Japanese Unexamined Patent Publication No. 2006-274227
PTL 9: Japanese Unexamined Patent Publication No. 2004-536624

SUMMARY OF INVENTION

Technical Problem

In view of the above problems, an object of the present invention is to provide modified sugar beet pectin that can provide an emulsion with excellent emulsifying properties, particularly emulsion stability, compared to known generally available sugar beet pectin. Another object of the present invention is to provide a method for easily producing the modified sugar beet pectin by a widely used heater. A further object of the present invention is to provide use of the modified sugar beet pectin as an emulsifier; an emulsion prepared using the modified sugar beet pectin, and use of the emulsion.

Solution to Problem

To solve the above problems, the present inventors carried out extensive research on methods for modifying sugar beet pectin, and found that modified sugar beet pectin with excellent emulsifying properties, particularly emulsion stability, can be obtained by heating sugar beet pectin in a water-dispersed state. Accordingly, the inventors analyzed the structure of the modified sugar beet pectin, and found that the modified sugar beet pectin is polymerized by the binding of a sugar via a protein component in the molecule as a linker; and that it has an increased amount of hydrophobic component (water-insoluble component), which forms a water-insoluble hydrogel, when it is dispersed in water.

In other words, it was revealed that the modified sugar beet pectin obtained by the above method has specific physical properties that are different from those of natural sugar beet pectin; for example, the modified sugar beet pectin has a higher molecular weight than natural sugar beet pectin, and contains a hydrophobic component (water-insoluble component). The present inventors further confirmed that when the modified sugar beet pectin having those properties is used as an emulsifier, an emulsion having a small initial particle diameter of oil droplets and high emulsion stability can be obtained due to an increased amount of adsorption of sugar beet pectin on the surface of oil droplet particles. The present invention has been accomplished based on these findings.

More specifically, the present invention provides a modified sugar beet pectin having specific physical properties, and a method for producing the modified sugar beet pectin. The present invention further provides use of the modified sugar beet pectin as an emulsifier; an emulsion prepared using the modified sugar beet pectin; and use of the emulsion.

(I) Modified Sugar Beet Pectin (I-1) Modified sugar beet pectin comprising a water-insoluble component, the water-insoluble component absorbing water to form a hydrogel, when the modified sugar beet pectin is dispersed in water at 25° C. to a final concentration of 0.1 mass %.

(I-2) The modified sugar beet pectin according to (I-1), which contains the water-insoluble component in an amount of at least 3 mass % and less than 90 mass %.

(I-3) The modified sugar beet pectin according to (I-1) or (I-2), which has a weight average molecular weight of at least $6.5 \times 10^5$ g/mol, as determined by homogenizing a 1.5 mass % aqueous dispersion of the modified sugar beet pectin at a pressure of 50 MPa, and subjecting the homogenized dispersion to size-exclusion chromatography coupled with a multi-angle light-scattering detector and a refractive index detector.

(I-4) The modified sugar beet pectin according to any one of (I-1) to (I-3), which has a root mean square radius of gyration of at least 50 nm, as determined by homogenizing a 1.5 mass % aqueous dispersion of the modified sugar beet pectin at a pressure of 50 MPa, and subjecting the homogenized dispersion to size-exclusion chromatography coupled with a multi-angle light-scattering detector and a refractive index detector.

(I-5) The modified sugar beet pectin according to any one of (I-1) to (I-4), which has a volume median particle diameter of at least 1 μm, as measured in the form of a 0.003 mass % aqueous dispersion thereof using a laser diffraction light-scattering particle size analyzer.

(I-6) Modified sugar beet pectin produced by a method described in any one of (II-1) to (II-4) below.

(I-7) The modified sugar beet pectin according to any one of (I-1) to (I-5) prepared by a method described in any one of (II-1) to (II-4) below.

(II) Method for Producing Modified Sugar Beet Pectin (II-1) A method for producing modified sugar beet pectin comprising heating an aqueous dispersion of sugar beet pectin.

(II-2) The method according to (II-1), wherein the aqueous dispersion of sugar beet pectin contains sugar beet pectin in an amount of 5 to 40 mass %.

(II-3) The method according to (II-1) or (II-2), wherein the heating temperature is 60 to 100° C.

(II-4) The method according to any one of (II-1) to (II-3), wherein the heating time is 1 to 48 hours.

(III) Emulsifier

An emulsifier comprising the modified sugar beet pectin of any one of (I-1) to (I-7).

(IV) Emulsion (IV-1) An emulsion obtained by using the emulsifier of (III).

(IV-2) An emulsion comprising: (A) the modified sugar beet pectin of any one of (I-1) to (I-7); (B) an isoprenoid or a lipid-soluble substance compatible therewith; (C) a fatty acid triglyceride; and (D) water.

(IV-3) The emulsion according to (IV-1) or (IV-2) wherein the oil phase of the emulsion has a specific gravity of 0.89 to 0.95 g/ml.

(IV-4) The emulsion according to any one of (IV-1) to (IV-3), wherein the (C) fatty acid triglyceride has a specific gravity of 0.9 to 0.97 g/ml.

(IV-5) The emulsion according to any one of (IV-1) to (IV-4), which is an O/W emulsion or a W/O/W emulsion.

(IV-6) The emulsion according to any one of (IV-1) to (IV-5), wherein the hydrophobic substance to be emulsified is edible.

(V) Food or Beverage

A food or beverage comprising the modified sugar beet pectin of any one of (I-1) to (I-7), the emulsifier of (III), or the emulsion of any one of (IV-1) to (IV-6).

(VI) Method for Enhancing the Emulsifying Properties of Sugar Beet Pectin (VI-1) A method for enhancing the emulsifying properties of sugar beet pectin, comprising heating sugar beet pectin after dispersing the sugar beet pectin in water.

(VI-2) The method according to (VI-1), wherein the dispersion contains the sugar beet pectin in an amount of 5 to 40 mass %, and the heating is performed at a temperature of 60 to 100° C. for 1 to 48 hours.

Advantageous Effects of Invention

An emulsion with excellent emulsifying properties, particularly emulsion stability, can be provided by using the modified sugar beet pectin of the present invention, or by using modified sugar beet pectin prepared by the method of the present invention.

DESCRIPTION OF EMBODIMENTS (I) Modified Sugar Beet Pectin and Method for Production Thereof The modified sugar beet pectin of the present invention has a structure and physical properties that are different from those of natural sugar beet pectin at least in the following features (1) to (4); and therefore has excellent emulsifying properties, particularly emulsion stability, compared to natural sugar beet pectin.

(1) A hydrophobic component (water-insoluble component) is contained.
(2) The weight average molecular weight is at least $6.5 \times 10^5$ g/mol.
(3) The root mean square radius of gyration is at least 50 nm.
(4) The volume median particle diameter is at least 1 μm.

In other words, the modified sugar beet pectin of the present invention is more highly polymerized than natural ordinary sugar beet pectin, and contains a large amount of a water-insoluble hydrophobic component (water-insoluble component). It is presumed that the modified sugar beet pectin has high emulsion stability for this reason.

Natural sugar beet pectin used as a starting material for producing the modified sugar beet pectin (hereinafter sometimes referred to as "sugar beet pectin (starting material)" to distinguish it from the modified sugar beet pectin of the present invention) is a natural high-molecular-weight polysaccharide extracted from sugar beet (*Beta vulgaris* LINNE var. *rapa* DUMORTIER.) under acidic conditions. As described above, sugar beet pectin is composed of: a backbone of α-1,4-glycoside-linked D-galactulonic acid (homo-D-galacturonan); a side chain mainly comprising a neutral sugar, such as arabinose or galactose; and a protein bound to the backbone and/or the side chain. Sugar beet pectin has higher emulsifying properties than citrus pectin because it contains a larger amount of a protein component than citrus pectin. Furthermore, sugar beet pectin (starting material) has a methyl esterification degree of 50% or more, and a total esterification degree of 85% or more, and is thus categorized as a high methoxyl pectin.

The sugar beet pectin (starting material) is generally sold in the form of a powder in the market, and is commercially available to anyone. Examples of commercially available products include VISTOP D-2250 (tradename, manufactured by San-Ei Gen F.F.I., Inc.).

The features (1) to (4) of the modified sugar beet pectin will be explained below.

Feature (1): A Hydrophobic Component (Water-Insoluble Component) is Contained.

A feature of the modified sugar beet pectin of the present invention is that it contains a water-insoluble component. The water-insoluble component absorbs water to form a hydrogel when the modified sugar beet pectin is dispersed in water at 25° C. to a final concentration of 0.1 mass %. In this specification, the "hydrogel" refers to a state formed by absorption of water by a component (water-insoluble component) that is not dissolved in water and is contained in the modified sugar beet pectin. In the specification, the "water-insoluble component" may also be referred to as a "hydrogel component", because the water-insoluble component forms a hydrogel by absorbing water.

The proportion of the water-insoluble component (hydrogel component) in the modified sugar beet pectin can be determined, for example, in the following manner.

1. One gram (weight a), on a dry weight basis, of the modified sugar beet pectin is placed into a beaker, and 1,000 g of ion-exchanged water (about 0.1 mass %) is added. After the mixture is well-mixed at room temperature (25° C.), the resulting mixture is allowed to stand at room temperature (25° C.) for 16 hours.
2. The obtained mixture is filtered through a 300-mesh wire gauze. When water stops passing through the wire gauze, the filtration residue left on the wire gauze is collected into a round bottom flask.
3. 200 ml of methanol is added to the obtained filtration residue for immersion at room temperature (25° C.) for 1 hour to precipitate the insoluble matter.
4. After removing the supernatant by decantation, the precipitate is dried under reduced pressure using a rotary evaporator.
5. The dry weight (weight b) of the obtained filtration residue is determined, and the proportion of the water-insoluble component in the modified sugar beet pectin is calculated according to the following formula:

[Formula 1]

Proportion of the water-insoluble component (mass %) =

$$\frac{\text{Dry weight [mass } b \text{] of the filtration residue}}{\text{Dry mass [mass } a \text{] of the composition containing the water-insoluble component}} \times 100$$

The modified sugar beet pectin of the present invention typically contains a water-insoluble component (hydrogel component) in an amount of 3 to 90 mass %, preferably 10 to 90 mass %, and more preferably 20 to 80 mass %. In contrast, natural sugar beet pectin (sugar beet pectin (starting material)) does not usually contain a water-insoluble component (hydrogel component), as shown in Experimental Example 1.

The content of the water-insoluble component (hydrogel component) can be used as an indicator of the degree of modification of the modified sugar beet pectin. The higher the content of the water-insoluble component, the further the modification of sugar beet pectin has advanced, thus indicating that the obtained modified sugar beet pectin has the desired excellent emulsifying properties and emulsion stability, particularly enhanced emulsion stability, of the present invention.

Feature (2): The Weight Average Molecular Weight is at Least $6.5 \times 10^5$ g/mol.

A feature of the modified sugar beet pectin of the present invention is that it has a higher polymerization degree than natural sugar beet pectin, i.e., sugar beet pectin (starting material). One of the indicators of polymerization is the "weight average molecular weight (Mw)".

The weight average molecular weight (Mw) can be determined by size-exclusion chromatography (SEC) coupled on-line with a multi-angle laser light-scattering (MALS) detector and a refractive index (RI) detector. In this specification, the size-exclusion chromatography is referred to as "SEC-MALS". In SEC-MALS, the molecular weight is measured by a MALS detector, and the weight of each component (composition ratio) is measured by an RI detector. SEC-MALS can measure the molecular weight of the analytical component without making a comparison with a standard sugar beet pectin of known molecular weight. The principle and characteristics of SEC-MALS are described in detail in Idris, O. H. M., Williams, P. A., Phillips, G. O.; Food Hydrocolloids, 12 (1998) pp. 375-388. Various parameters such as the weight average molecular weight (Mw), recovery rate (% Mass), polydispersity index (P), and root mean square radius of gyration (Rg) can be obtained by processing the data obtained by SEC-MALS, using software such as ASTRA Version 4.5 (Wyatt Technology Corporation).

The SEC-MALS measurement conditions used in the present invention are as follows:
Column: OHpak SB-806M HQ (manufactured by Showa Denko K.K.)
Column temperature: 25° C.
Flow rate: 0.5 ml/min
Elution solvent: 0.5 M $NaNO_3$
Amount of sample solution added: 100 μl
Refractive index increment at a concentration (dn/dc): 0.135
Detector temperature: 25° C. (both MALS and RI)
MALS detector: DAWN DSP (manufactured by Wyatt Technology Corporation, USA)
RI detector: RI-930 (manufactured by Jasco Corporation).

A feature of the modified sugar beet pectin of the present invention is that it has a weight average molecular weight of at least $6.5 \times 10^5$ g/mol, as determined by dispersing the modified sugar beet pectin in ion-exchanged water to a final concentration of 1.5 mass %, homogenizing the dispersion of the modified sugar beet pectin at a pressure of 50 MPa, and subjecting the homogenized dispersion to the above-mentioned SEC-MALLS. The weight average molecular weight is preferably not less than $7.5 \times 10^5$ g/mol, and not more than $1 \times 10^7$ g/mol.

The homogenized dispersion subjected to SEC-MALLS can be prepared, for example, by the following method described in Experimental Example 1 below.

1. A 1.5 g quantity, on a dry weight basis, of the sugar beet pectin is added to 98.5 g of ion-exchanged water, and the mixture is stirred using a Polytron homogenizer at 26,000 rpm for 1 minute to prepare a 1.5 mass % sugar beet pectin dispersion.
2. The dispersion is homogenized at 50 MPa using a collision-type generator, diluted 30-fold with a 0.5 M $NaNO_3$ aqueous solution, and stirred using a Polytron homogenizer at 26,000 rpm for 1 minute to prepare a 0.05% (W/V) sugar beet pectin dispersion.
3. The dispersion is filtered through a PTFE membrane filter with a pore size of 0.45 μm to obtain a filtrate.

When the weight average molecular weight (Mw) is less than $6.5 \times 10^5$ g/mol improvement in emulsifying properties and emulsion stability is not observed. When the weight average molecular weight (Mw) is more than $1 \times 10^7$ g/mol, the homogenization treatment becomes difficult. Thus, neither is preferable. Natural sugar beet pectin (sugar beet pectin (starting material)) typically has a weight average molecular weight (Mw) of not more than $5.5 \times 10^5$ g/mol, as shown in Experimental Example 1.

(3) The Root Mean Square Radius of Gyration is at Least 50 nm.

The root mean square radius of gyration (Rg) as well as the weight average molecular weight (Mw) can be obtained by subjecting the homogenized dispersion to SEC-MALLS under the above-mentioned conditions, and processing the SEC-MALLS data using software such as ASTRA Version 4.5. The root mean square radius of gyration refers to the mean squared distance of elements of the molecule from the rotational center (≈ center of gravity) of the molecule, which correlates with the space occupation ratio of the molecule.

A feature of the modified sugar beet pectin of the present invention is that it has a root mean square radius of gyration of at least 50 nm, as determined by dispersing the modified sugar beet pectin in ion-exchanged water to a final concentration of 1.5 mass %, then homogenizing the dispersion at a pressure of 50 MPa, and subjecting the homogenized dispersion to the above-mentioned SEC-MALLS. The radius of gyration is preferably not less than 55 nm, and more preferably 60 to 80 nm.

(4) The Volume Median Particle Diameter is at Least 1 μm.

The "volume median particle diameter" is another indicator indicating that the modified sugar beet pectin of the present invention is more highly polymerized than sugar beet pectin (starting material).

A feature of the modified sugar beet pectin of the present invention is that it has a volume median particle diameter of at least 1 μm, as measured by dispersing the modified sugar beet pectin in ion-exchanged water to a final concentration of 0.003 mass %, and subjected to measurement using a laser diffraction light-scattering particle size analyzer. Preferably, the volume median particle diameter is 2 μm to 20 μm.

The volume median particle diameter can be measured by using a laser diffraction light-scattering particle size analyzer. The sample to be subjected to measurement using this analyzer can be prepared, for example, by the following method, as described in Experimental Example 2 below.

1. A 0.45 g quantity (on a dry weight basis) of modified sugar beet pectin is added to 150 g of ion-exchanged water, and the mixture is stirred using a Polytron mixer at 26,000 rpm for 1 minute to prepare an about 0.3 mass % sugar beet pectin dispersion.
2. The dispersion is diluted 100-fold with ion-exchanged water (final concentration of the modified sugar beet pectin: about 0.003 mass %).

When the volume median particle diameter is 0.4 μm or less, improvement in emulsion properties and emulsion stability is not observed. When the volume median particle diameter is more than 30 μm, the homogenization treatment becomes difficult. Thus, neither is preferable. Natural sugar beet pectin (sugar beet pectin (starting material)) typically has a volume median particle diameter of not more than 0.35 μm, as described in Experimental Example 2.

The modified sugar beet pectin of the present invention having the above properties can be produced by heating an aqueous dispersion of sugar beet pectin (starting material). The sugar beet pectin (starting material) to be modified in the present invention may be in any form, such as blocks, beads, coarse pulverizates, granules, pellets, and powders (including spray-dried powders).

The aqueous dispersion of sugar beet pectin (starting material) includes an "aqueous solution of sugar beet pectin (starting material)" in which sugar beet pectin is dissolved in water; a dispersion of sugar beet pectin (starting material) in which part of the sugar beet pectin (starting material) is dissolved in water, and part of the sugar beet pectin is undissolved; a suspension or a paste of sugar beet pectin (starting material); and "sugar beet pectin in the form of a wet cake", which is produced by concentrating a solution of a high molecular weight polysaccharide that is extracted from the sugar beet under acidic conditions. Any of the above forms of the aqueous dispersion of sugar beet pectin (starting material) can be heated to produce the sugar beet pectin of the present invention.

When sugar beet pectin (starting material) is dispersed in water as described above, the weight ratio of the sugar beet pectin (starting material) to water is typically in the range of 5:95 to 40:60, or 10:90 to 40:60, and preferably 10:90 to 35:65 (i.e., the amount of the sugar beet pectin (starting material) is 5 to 40 mass %, preferably 10 to 40 mass %, and more preferably 10 to 35 mass %). The water to be supplied may have any temperature, and thus may be room temperature water or heated water. The water may be tap water, ion-exchanged water, or distilled water. Ion-exchanged water is preferable.

Alternatively, the sugar beet pectin dispersion may be heated after being mixed with other polysaccharides and/or a component having a surface-activating effect. Examples of such polysaccharides include other plant-derived pectins such as citrus pectin and apple pectin; polysaccharides having emulsifying properties such as gum arabic, ghatti gum, soybean polysaccharide, *Quillaja saponin*, and octenyl succinate starch; and viscous polysaccharides such as xanthane gum, guar gum, locust bean gum, carrageenan, gellan gum, and glucomannan. Examples of the component having a surface-activating effect include synthetic emulsifiers such as monoglycerol fatty acid ester, polyglycerol fatty acid ester, sucrose fatty acid ester, sorbitan fatty acid ester, and propylene glycol fatty acid ester; and protein emulsifiers such as casein sodium and lecithin.

The heating temperature is typically 60 to 100° C., and preferably 75 to 100° C. The heating time is not limited, and is preferably 1 to 24 hours. The heating method is not particularly limited; and examples of usable heating methods include warming in hot water, saturated steam heating, heated steam heating, heating wire heating, induction heating, etc. If necessary, stirring may be performed during the heating. The heating may also be performed at a pressure lower than atmospheric pressure, i.e., under reduced pressure. The reduced-pressure conditions are not particularly limited; and may be, for example, about 0.01 to about 900 hPa, preferably about 300 to about 800 hPa, and more preferably about 500 to about 750 hPa.

As explained above, the modified sugar beet pectin of the present invention with excellent emulsion stability can be obtained even under relatively mild conditions by dispersing sugar beet pectin in water to the above-mentioned concentration, and heating the dispersion within the above-mentioned temperature range for the above-mentioned time period. After the heating step, a drying step may be performed according to a known method, if necessary.

The modified sugar beet pectin prepared by the above method has excellent emulsifying properties, particularly emulsion stability, compared to the sugar beet pectin (starting material). In general, the emulsifying stability of an emulsifier is evaluated as follows. The smaller the median particle diameter of the oil droplets in the obtained emulsion, and the longer and the more stably the oil droplet particle diameter is maintained, the higher the emulsion stability of the emulsifier (see "Studies on the Oil-in-Water Emulsions Stabilized with Gum Arabic by Using the Turbidity Ratio Method", Journal of the Pharmaceutical Society of Japan, 112 (12), 906-913 (1992)).

The method of preparing an emulsion used as a reference for evaluation of emulsifying ability, the method of measuring the median particle diameter, and the method of evaluating emulsion stability over time according to the present invention can be carried out according to the methods described in the Experimental Examples below.

The emulsion prepared by using the modified sugar beet pectin of the invention as an emulsifier has a small median particle diameter of oil droplets; and the change over time in the particle diameter is also small, compared to the emulsion prepared using sugar beet pectin (starting material). That is, the modified sugar beet pectin has higher emulsifying properties and emulsion stability than sugar beet pectin (starting material).

This action mechanism is probably such that intermolecular or intramolecular bonding via a protein component occurs upon heating, which increases the hydrophobicity of pectin and thereby increases the surface-activating ability. In fact, the modified sugar beet pectin of the present invention is polymerized by the binding of a sugar chain via a proteinaceous moiety of the molecule as a linker; and there is an increase in the amount of a hydrophobic component (a water-insoluble component: hydrogel component) that is not dissolved in water, when the modified sugar beet pectin is dispersed in water. It is presumed that the amount adsorbed on oil droplet particles increases for this reason. The modified sugar beet pectin maintains its high molecular weight even after being subjected to high-pressure homogenization. The emulsion prepared by using the modified sugar beet pectin as an emulsifier and using a high pressure homogenizer has a small median particle diameter of oil droplets; and the change over time in the median particle diameter is also small, compared to the emulsion prepared by using sugar beet pectin (starting material) as an emulsifier. Thus, the modified sugar beet pectin has higher emulsifying activity and emulsion stability than sugar beet pectin (starting material). Another advantage of using the modified sugar beet pectin is that the amount to be incorporated into the emulsion composition can be reduced, compared to the sugar beet pectin (starting material).

(II) Emulsifier

The modified sugar beet pectin of the present invention can be used as an emulsifier. In other words, an emulsifier can be prepared by using the modified sugar beet pectin of the present invention.

The emulsifier of the invention is particularly suitable for edible products that can be taken orally, in the field of foods, pharmaceuticals, quasi-drugs, or fragrances and cosmetics. More specifically, the emulsifier of the present invention can be suitably used to emulsify food products such as beverages, powdered beverages, desserts, chewing gums, tablet confections, snacks, processed marine products, processed animal products, and retort pouch foods; oil-based flavorings; oil-based colorants; etc.

In the emulsifier of the present invention, the modified sugar beet pectin of the present invention may be used per se in the form of an aqueous solution, or in the form of a solid such as granules or powders (100 mass % of modified sugar beet pectin). Alternatively, the modified sugar beet pectin may be mixed with other carriers and additives, if necessary, and used as an emulsifier formulation. In this case, usable carriers and additives can be suitably selected in a usual manner according to the kind and use of the product into which the emulsifier is incorporated. For example, a sugar such as dextrin, maltose, or lactose, and a polyhydric alcohol such as glycerol or propylene glycol can be added to prepare an emulsifier formulation.

Alternatively, the emulsifier of the present invention may be mixed with other polysaccharides and components having a surface-activating effect, and used as an emulsifier formulation (preparation). For example, the emulsifier can be mixed with another plant-derived pectin such as citrus pectin or apple pectin; a polysaccharide having emulsifying properties such as gum arabic, ghatti gum, soybean polysaccharide, *Quillaja saponin*, or octenyl succinated starch; a viscous polysaccharide such as xanthane gum, guar gum, locust bean gum, carrageenan, gellan gum, or glucomannan; etc. Further, the emulsifier may be mixed with a synthetic emulsifier such as monoglycerol fatty acid ester, polyglycerol fatty acid ester, sucrose fatty acid ester, sorbitan fatty acid ester, or propylene glycol fatty acid ester; or a protein emulsifier such as casein sodium or lecithin.

The proportion of modified sugar beet pectin in the emulsifier preparation is preferably 1 mass % or more, more preferably 10 mass % or more, and even more preferably 20 mass % or more.

(III) Emulsion

The present invention provides an emulsion prepared by using the above-mentioned modified sugar beet pectin, or by using an emulsifier comprising the modified sugar beet pectin as an active ingredient.

The emulsion can be prepared by dispersing and stabilizing a hydrophobic substance, which is a dispersoid, in a hydrophilic dispersion medium using, as an emulsifier, the above-mentioned modified sugar beet pectin, or an emulsifier containing the modified sugar beet pectin as an active ingredient. Examples of the emulsion include oil-in-water (O/W) emulsions and W/O/W emulsions.

The proportion of the modified sugar beet pectin or emulsifier containing the modified sugar beet pectin as an active ingredient in the emulsion can be suitably adjusted according to the hydrophobic substance to be dispersed. For example, the proportion may be such that the final emulsion contains the modified sugar beet pectin in a concentration of about 0.01 to about 10 mass %, and preferably 0.05 to 5 mass % per 100 mass % of the emulsion. As the proportion of the emulsifier, even less than 1 mass % of the modified sugar beet pectin of the present invention can provide an emulsion with high emulsion stability, whereas at least 1 mass % of sugar beet pectin (starting material) is necessary to provide high emulsion stability.

The hydrophobic substance to be emulsified in the present invention may be any substance that is usually formulated into an emulsion or that must be processed into an emulsion. Hydrophobic substances used in the field of foods, pharmaceuticals, quasi-drugs, or fragrances and cosmetics are preferable; and those that can be taken orally, i.e., edible hydrophobic substances, are more preferable.

Specific examples of hydrophobic substances include essential oils obtained from plant sources such as orange, lime, lemon, grapefruit, and like citrus plants; oleoresins obtained from plant sources such as pepper, cinnamon, and ginger by the oleoresin process; absolutes obtained from plant sources such as jasmine and rose by the absolute process; oil-based flavorings such as oil-based synthetic flavoring compounds and oil-based flavoring compositions; oil-based colorants such as β-carotene, paprika pigment, lycopene, palm oil, carotene, astaxanthin, *Dunaliella carotene*, and carrot carotene; oil-soluble vitamins such as vitamins A, D, E, and K; polyunsaturated fatty acids such as docosahexaenoic acid, eicosapentaenoic acid, and γ-linolenic acid; animal and vegetable fats and oils such as soybean oil, rapeseed oil, corn oil, plant sterol, and fish oil; SAIB (sucrose acetate isobutyrate), ester gum (glycerol triabietate ester); processed food oils such as $C_6$-$C_{12}$ medium-chain triglycerides; and mixtures of any of such edible oil materials.

The method for preparing the emulsion is not particularly limited. The emulsion can be prepared, for example, by mechanically stirring and emulsifying a hydrophobic substance and a hydrophilic substance in the presence of the emulsifier by utilizing a homogenizer or a high-pressure ejection system, according to a usual method for preparing oil-in-water (O/W) emulsions or W/O/W emulsions. More specifically, the following method can be mentioned as an example.

First, the emulsifier of the present invention comprising the modified sugar beet pectin as an active ingredient is dissolved in a hydrophilic solvent such as water. A target hydrophobic substance (e.g., an oil or fat, or a mixture obtained by dissolving a flavoring and/or a colorant in an oil or fat) is admixed with the aqueous sugar beet pectin solution using a stirrer or the like for preliminary emulsification. During this process, a specific gravity-adjusting agent such as ester gum or SAIB may be used to adjust the specific gravity of the hydrophobic substance. The preliminary emulsion thus obtained is then emulsified using emulsifying equipment.

Examples of usable hydrophobic substances include the substances mentioned above. However, when an oil-based flavoring or an oil-based colorant is used to prepare an emulsified flavoring or an emulsified colorant, a mixture prepared by dissolving an oil-based flavoring or an oil-based colorant in oil or fat is preferably used as the hydrophobic substance. This enables more stable emulsification, and prevents the components from evaporating. The oils and fats in which the oil-based flavoring and oil-based colorant are dissolved are not particularly limited; and, for example, medium-chain triglycerides ($C_{6-12}$ fatty acid triglycerides), and vegetable oils such as corn oil, safflower oil and soybean oil can be typically used.

The emulsifying equipment used for the emulsification is not particularly limited, and can be suitably selected according to the desired oil droplet particle size and viscosity of the sample. Emulsifying equipment such as high-pressure homogenizers, nanomizers, disper mills, and colloid mills can be used.

As described above, the emulsification step is carried out by a process comprising adding a hydrophobic substance to a hydrophilic solvent with stirring; rotating stirring blades for preliminary emulsification to prepare an emulsion of oil droplets with a particle diameter of about 2 to about 5 μm; then preparing an emulsion of very small and uniform particles (for example, with a median particle diameter of not more than 1 μm, and preferably not more than 0.8 μm) by using emulsifying equipment such as a homogenizer or a nanomizer.

Most of the colorants such as β-carotene exist in the form of crystal suspensions. Therefore, to prepare such a colorant into an emulsion (emulsified colorants), it is preferable to mix and dissolve crystals of the colorant in a suitable oil or fat at an elevated temperature beforehand, and then add the resulting solution into a hydrophilic solvent. The effect of the present invention is not impaired whether the colorant is dispersed in the form of a liquid or a solid.

Compared with an emulsion prepared using only sugar beet pectin (starting material), an emulsion prepared using the modified sugar beet pectin has a uniform particle size distribution of oil droplets, and has high emulsion stability such that degradation of the emulsion caused by agglomeration or coalescence of oil droplets due to stresses (severe conditions) such as heating, long-term storage, and change over time is significantly inhibited.

The proportions of the hydrophilic solvent and the hydrophobic substance in the emulsion of the present invention can be suitably adjusted. For example, the hydrophilic dispersion medium:hydrophobic substance ratio is 50:50 to 99:1, and preferably 70:30 to 95:5.

The emulsion of the present invention includes emulsions (O/W emulsions and W/O/W emulsions) comprising the following components:
(A) modified sugar beet pectin;
(B) isoprenoid or a lipid-soluble substance compatible with isoprenoid;
(C) fatty acid triglyceride; and
(D) water.

A feature of the above emulsion is that the emulsifying properties of the emulsion are stably maintained over a long period of time, even when the emulsion does not contain, as a component, a chemically synthesized specific gravity adjusting agent, such as brominated edible oil, clamor gum, ester gum, or SAIB. More specifically, the above emulsion has a feature in that the specific gravity of the oil phase consisting of an isoprenoid and a lipid-soluble substance dissolved in the isoprenoid (e.g., a nutrient such as a lipid-soluble vitamin or DHA, a colorant, a flavoring, etc.) is adjusted only by fatty acid triglyceride, and the quality of the emulsion can be stably maintained even in a beverage or a beverage concentrate for a long period of time.

The proportion of the modified sugar beet pectin (A) in the emulsion may be 0.01 to 5 mass %, and preferably 0.05 to 3 mass %.

Examples of the isoprenoid (B) include terpenes such as monoterpenes, sesquiterpenes, diterpenes, sesterterpenes, triterpenes, and tetraterpenes; and lipid-soluble substances such as terpenoids having carbonyl groups and hydroxy groups. Specific examples thereof include D-limonene, dipentene (1-methyl-4-(1-methylethenyl)cyclohexene), myrcene, α-pinene, linalool, and mixtures thereof; essential oils obtained from plant sources such as orange, lime, lemon, grapefruit, and like citrus plants; resinoids and oleoresins obtained from plant sources such as pepper, cinnamon, and ginger by the oleoresin process; etc. The oil-soluble component compatible with an isoprenoid is not particularly limited, and examples of the oil-soluble component include oil-soluble vitamins such as vitamins A, D, E, and K, and coenzyme Q10; polyunsaturated fatty acids such as docosahexaenoic acid, eicosapentaenoic acid, and γ-linolenic acid; oil-based colorants such as β-carotene, paprika pigment, lycopene, astaxanthin, *Dunaliella carotene*, and carrot carotene; and lipid-soluble flavorings extracted from various natural ingredients.

Examples of the fatty acid triglyceride (C) include any of the fatty acid triglycerides used in the production of foods. Specific examples thereof include animal or vegetable oils and fats such as palm oil, soybean oil, rapeseed oil, corn oil, plant sterol, beef tallow, lard, and fish oil; food oils and fats such as $C_{6-12}$ medium chain triglyceride; etc. A fatty acid triglyceride having a specific gravity of 0.9 to 0.97 g/ml is preferable.

The proportions of the lipid-soluble component compatible with isoprenoid (B) and the fatty acid triglyceride (C) can be suitably selected according to the types of isoprenoid and fatty acid triglyceride used. The proportions may be selected in such a manner that the final specific gravity after mixing the components (B) and (C) becomes 0.89 to 0.95 g/ml, and preferably 0.89 to 0.93 g/ml.

The method of producing the emulsion is not particularly limited, and the emulsion can be produced according to the above-mentioned method. For example, a usable method may comprise dissolving the modified sugar beet pectin of the present invention in a hydrophilic solvent, such as water; adding thereto a mixture of (B) and (C), and mixing using a stirrer or the like for preliminary emulsification; and then emulsifying the preliminarily emulsified mixture under high pressure conditions utilizing emulsifying equipment.

In the emulsification step, as described above, a hydrophobic substance is added to a hydrophilic dispersion medium with stirring, and stirring blades are rotated for preliminary emulsification to give an emulsion of oil droplets with a particle diameter of about 2 to 5 µm. An emulsion of very small and uniform particles (for example, with a median particle diameter of not more than 1 µm, and preferably not more than 0.8 µm) is prepared by using a homogenizer, a nanomizer, or like emulsifying equipment.

The proportions of the hydrophobic substance and the hydrophilic dispersion medium in the emulsion can be suitably adjusted. For example, the hydrophobic substance:hydrophilic dispersion medium ratio may be 50:50 to 99:1, and preferably 70:30 to 95:5.

Compared to the emulsion prepared using the sugar beet pectin (starting material), the emulsion thus prepared has a smaller median particle diameter and a uniform particle size distribution, and also has high emulsifying activity and emulsion stability such that degradation of the emulsion caused by agglomeration or coalescence of oil droplets due to heating and long-term storage is significantly inhibited.

(IV) Food or Beverage Using the Emulsion

The food or beverage provided by the present invention may be any food or beverage prepared using any of the modified sugar beet pectin, the emulsifier comprising the modified sugar beet pectin, and the emulsion prepared using the modified sugar beet pectin or the emulsifier containing the modified sugar beet pectin. Examples of the food or beverage include, but are not limited to, beverages such as milk beverages, lactic acid bacteria beverages, carbonated beverages, fruit beverages, powdered beverages, sports drinks, black tea beverages, and green tea beverages; puddings such as custard puddings and milk puddings; desserts such as jellies, Bavarian creams, and yogurts; frozen desserts such as milk ice creams and ice candies; gums such as chewing gums and bubble gums; chocolates, for example, coated chocolates such as marble chocolates, flavored chocolates such as melon chocolate; caramels such as hard candies, soft candies, caramels, and drops; baked confections such as hard biscuits, cookies, and okaki (rice crackers); soups such as corn soups and potage; sauces such as dressings, ketchup, mayonnaise, baste, and Worcestershire sauce; processed meats such as hams, sausages, and roast porks; fish paste products such as fish sausages and kamaboko (fish paste cakes); oil and fat products such as butter, margarine, and cheese; and like processed foods.

The method of preparing such foods and beverages may be any method in which the modified sugar beet pectin of the present invention, the emulsifier containing the modified sugar beet pectin, or the emulsion prepared using the modified sugar beet pectin or the emulsifier is used as a starting material. The method can easily produce foods and beverages with excellent emulsifying properties and emulsion stability by utilizing existing manufacturing facilities without the necessity of setting special production conditions.

The beverage prepared using the emulsion comprising the components (A) to (D) is not particularly limited. Examples of such beverages include, but are not limited to, carbonated beverages, fruit beverages, powdered beverages, sports drinks, black tea beverages, green tea beverages, milk beverages, and lactic acid bacteria beverages.

To impart a color, a flavor, a nutrient, etc. to a beverage, the emulsion is typically blended with an undiluted beverage solution mainly consisting of water or a hydrophilic solvent, or a beverage concentrate.

When the emulsion is blended with an undiluted beverage solution, the blend per se may be packed into a container etc., and shipped as a product. After shipping and until drinking, the product is usually stored or transported at room temperature. During that period, preventing prominent floating or agglomeration of the oil phase in the product is required. In contrast, when the emulsion is blended with a beverage concentrate, the blend may be manufactured into a product after dilution; or the blend per se may be distributed, and diluted just before drinking. The undiluted blend may be stored or transported at room temperature; and during that period, preventing prominent floating or agglomeration of the oil phase in the undiluted blend is required. In general, beverage concentrates have higher viscosities than diluted beverages. In this point, oil phase floating is less likely to occur. However, the specific gravity of the concentrate is also high. Therefore, when the specific gravity difference between the oil and aqueous phases is large, oil floating may instead be accelerated.

In general, when using an emulsion prepared without using a chemically synthesized specific gravity-adjusting agent, floating of the oil phase in the beverage, etc. is confirmed in a relatively short time. However, when using the emulsion containing the components (A) to (D), the stability of the oil phase in the obtained beverage is remarkably enhanced, and deterioration of the beverage product, such as enlargement of oil droplets, and floating of oil phase components in the upper portion of the beverage or reduction of oil phase components in the lower portion of the beverage (otherwise known as "shitasuki" (lower concentration at the bottom)) due to the enlargement the enlargement is less likely to occur even after a long period of storage.

(V) Method of Enhancing the Emulsion Stability

The emulsifying properties of sugar beet pectin (starting material) can be improved by preparing the modified sugar beet pectin of the present invention. Compared with an emulsion prepared using sugar beet pectin (starting material), an emulsion prepared using the modified sugar beet pectin of the present invention has a smaller median particle diameter and a uniform particle size distribution of oil droplets; and also has high emulsifying activity and emulsion stability such that degradation of the emulsion caused by agglomeration or coalescence of oil droplets due to heating and long-term storage is significantly inhibited.

More specifically, the emulsifying properties of sugar beet pectin can be improved by modifying the sugar beet pectin according to the method described in (I). Thus, the present invention also provides a method for enhancing the emulsifying properties of sugar beet pectin. The method for enhancing the emulsifying properties of sugar beet pectin can be performed according to the method described in (I).

EXAMPLES

The present invention is more specifically explained below in reference to Examples, Comparative Examples and Test Examples. The present invention is, however, not limited to those examples. In the explanation below, "%" means "mass %", unless otherwise specified. "*" represents a registered trademark of San-Ei Gen F.F.I., Inc.

As a starting material, a powder sample of sugar beet pectin with a molecular weight of about 500,000 and a loss on drying of about 10% was used (VISTOP D-2250, particle diameter=100 to 150 µm; product of San-Ei Gen F.F.I., Inc.). This material is hereinafter referred to as "sugar beet pectin (starting material)".

Examples 1-5

Modified Sugar Beet Pectin (Modified Products 1 to 5)

Sugar beet pectins (starting materials) were individually mixed with ion-exchanged water at the ratios specified in Table 1 using a KitchenAid Mixer KSM5 (product of FMI Corp.; same hereunder). Each mixture was poured into an airtight container, and heated using a thermostatic chamber SH-641 (product of Espec Corp.; same hereunder) (Table 1). The heating was performed at 75° C. for 8 to 12 hours. After the heating, the mixture was freeze-dried using an FDU-1100 freeze-drying unit (product of Tokyo Rikakikai Co. Ltd.; same hereunder), followed by pulverization in a mortar to obtain powder-form modified sugar beet pectin (modified products 1 to 5).

Examples 6-7

Modified Sugar Beet Pectin (Modified Products 6 to 7)

Sugar beet pectins (starting materials) were individually dispersed in ion-exchanged water at the ratios specified in Table 1 using a KitchenAid Mixer KSM5 (product of FMI; same hereunder). After being poured into a recovery flask, the dispersion was heated using an N-1000V rotary evaporator system with water bath (product of Tokyo Rikakikai Co. Ltd.; same hereunder) under reduced pressure (700 hPa). The heating was performed at 80° C. for 5 to 8 hours. After the heating, the mixture was freeze-dried using an FDU-1100 freeze-drying unit (product of Tokyo Rikakikai Co. Ltd.; same hereunder), followed by pulverization in a mortar to obtain powder-form modified sugar beet pectin (modified products 6 to 7).

Comparative Example 1

Unmodified Sugar Beet Pectin (Unmodified Product 1)

As an unmodified product 1, the powder-form sugar beet pectin (starting material) used for preparation of the modified sugar beet pectin in Examples 1 to 7 was used.

Comparative Example 2

Unmodified Sugar Beet Pectin (Unmodified Product 2)

As an unmodified product 2, the powder-form sugar beet pectin (starting material) was taken from a different lot from that of the pectin material (unmodified product 1, Comparative Example 1) used for preparation of the modified sugar beet pectin in Examples 1 to 7.

Comparative Example 3

Unmodified Sugar Beet Pectin (Unmodified Product 3)

As an unmodified product 3, the powder-form sugar beet pectin (starting material) was taken from a different lot from those of the above-mentioned unmodified product 1 (Comparative Example 1) and the unmodified product 2 (Comparative Example 2).

Comparative Example 4

Unmodified Sugar Beet Pectin (Unmodified Product 4)

As an unmodified product 4, the powder-form sugar beet pectin (starting material) was taken from a different lot from those of the above-mentioned unmodified product 1 (Comparative Example 1) to unmodified product 3 (Comparative Example 3).

TABLE 1

|  | Mixing ratio (mass ratio) (sugar beet pectin (starting material):water) | Temperature (° C.) | Heating time (hour) | Equipments | Pressure |
|---|---|---|---|---|---|
| Example 1 | 20:80 | 75 | 8 | Thermostatic chamber | Ordinary pressure |
| Example 2 | 20:80 | 75 | 10 | Thermostatic chamber | Ordinary pressure |
| Example 3 | 20:80 | 75 | 12 | Thermostatic chamber | Ordinary pressure |
| Example 4 | 35:65 | 75 | 8 | Thermostatic chamber | Ordinary pressure |
| Example 5 | 20:80 | 75 | 12 | Evaporator | Reduced pressure |
| Example 6 | 20:80 | 80 | 5 | Evaporator | Reduced pressure |
| Example 7 | 20:80 | 80 | 8 | Evaporator | Reduced pressure |
| Comparative Example 1 | Unmodified product 1 | — | — | — |  |
| Comparative Example 2 | Unmodified product 2 | — | — | — |  |
| Comparative Example 3 | Unmodified product 3 | — | — | — |  |
| Comparative Example 4 | Unmodified product 4 | — | — | — |  |

Test Example 1

Evaluation of Sugar Beet Pectin

For each of the sugar beet pectins (Examples 1-7 and Comparative Examples 1-4) prepared above, (1) the water-insoluble component production amount in the aqueous dispersion, (2) weight average molecular weight ($M_w$), and root mean square radius of gyration ($R_g$) were measured. Emulsion compositions were prepared using these sugar beet pectins, and (3) their emulsion characteristics (emulsifying properties and emulsion stabilities) were evaluated.

(1) Measurement of Water-Insoluble Component Production Amount in Aqueous Dispersion 1. 1 g in dry weight (weight a) of sugar beet pectin was placed into a beaker, and 1,000 g of ion-exchanged water was added thereto (about 0.1 mass %). The mixture was mixed well at room temperature (25° C.), and then allowed to stand at room temperature (25° C.) for 16 hours.
2. The mixture was then filtered through a 300-mesh wire gauze. When the water stopped passing through the wire gauze, the filtration residue left on the wire gauze was collected into a round bottom flask.
3. 200 ml of methanol was added to the obtained filtration residue. The residues were immersed in the methanol, and allowed to stand at room temperature (25° C.) for an hour to precipitate the insoluble matter.
4. After removing the supernatant by decantation, the precipitate was dried under reduced pressure using a rotary evaporator.
5. The dry weight (weight b) of the obtained filtration residue was determined, and the proportion of the water-insoluble component contained in the dispersion was calculated according to the following equation so as to find a "water-insoluble component production amount in aqueous dispersion (mass %)".

$$\text{Content of water-insoluble component (mass \%)} = \frac{\text{dry weight of filtration residue (weight } b)}{\text{dry weight of sugar beet pectin (weight } a)} \times 100 \quad \text{[Formula 2]}$$

(2) Measurements of Weight Average Molecular Weight ($M_w$) and Root Mean Square Radius of Gyration ($R_g$)

1.5 g (dry weight) of sugar beet pectin was added to 98.5 g of ion-exchanged water. The liquid was stirred at 26,000 rpm for 1 minute using a polythoron homogenizer, thereby preparing a 1.5 mass % sugar beet pectin dispersion.

The dispersion was homogenized at 50 MPa using a collision-type generator (Nano-Mizer NM2; product of Yoshida Kikai Co. Ltd.; same hereunder). The homogenized dispersion was diluted 30-fold with 0.5 M of a $NaNO_3$ aqueous solution, followed by stirring at 26,000 rpm for 1 minute using a polythoron homogenizer, thereby preparing a 0.05% (W/V) sugar beet pectin dispersion. After filtering this dispersion using a PTFE membrane filter having a pore size of 0.45 μm, the resulting liquid was subjected to size-exclusion chromatography (SEC-MALLS) coupled with a multi-angle laser light-scattering detector (MALLS detector) and a refractive index detector (RI detector) as detailed below, thereby measuring the weight average molecular weight ($M_w$) and the root mean square radius of gyration ($R_g$) of the sugar beet pectin.

SEC-MALLS allows detection of $M_w$ of sugar beet pectin by the MALLS detector, and allows detection of root mean square radius of gyration ($R_g$) of sugar beet pectin by the MALLS detector and the RI detector, thereby finding the molecular weight of sugar beet pectin without making a comparison with a standard product of known molecular weight. The software used for analysis was ASTRA Version 4.5 (product of Wyatt Technology Corporation).

Measurement Conditions of Size-Exclusion Chromatography

Column: OHpak SB-806M HQ (product of Showa Denko K.K.)
Column temperature: 25° C.
Flow rate: 0.5 ml/min
Elution solvent: 0.5 M $NaNO_3$
Amount of sample solution=100 μl.

Device Conditions of MALLS Detector and RI Detector

MALLS detector: DAWN DSP (product of Wyatt Technology Corporation, US)
RI detector: RI-930 (product of Jasco Corporation)
Refractive-index increment with respect to concentration (dn/dc)=0.135
MALLS detector: LS#4-#13 (ten detectors in total arranged at 26°-132°)
Detector temperature: 25° C. (MALLS and RI)

(3) Measurement of Emulsification Characteristics (Emulsifying Properties, Emulsion Stability)

As shown below, emulsions were prepared using the sugar beet pectins of Examples 1 to 7 and Comparative Examples 1 to 4 (Examples 1-1 to 1-7, Comparative Examples 1-1 to 1-4). The median particle diameter on a volume basis (hereinafter, "median particle diameter" refers to "median particle diameter on a volume basis", unless otherwise specified) immediately after the preparation and after three-day preservation at 60° C., and the proportion of oil droplet particles having a particle diameter of 1 μm or greater among all of the droplet particles in the emulsion were measured for each emulsion.

Test Samples 1-1 to 1-7

2 g (dry weight) each of the modified sugar beet pectins of Examples 1 to 7 (modified products) were individually added to 83 g of ion-exchanged water, and a citric acid aqueous solution was added to each liquid to adjust the pH to 3.25. While stirring each liquid at 24,000 rpm using a high-speed mixer (product of Heidolph Instruments; same hereunder), 15 g of medium-chain triglyceride (octanoic acid/decanoic acid triglyceride: O.D.O. (tradename), product of Nisshin OilliO, Ltd.; same hereunder) was added, and each liquid was well-mixed for 1 minute. The resulting mixture liquids were homogenized twice at a pressure of 50 MPa using a collision-type generator, thereby preparing emulsions (Test samples 1-1 to 1-7).

Comparative Test Samples 1-1 to 1-4

2 g (dry weight) each of the sugar beet pectins of Comparative Examples 1 to 4 (unmodified products) were individually added to 83 g of ion-exchanged water, and a citric acid aqueous solution was added to each liquid to adjust the pH to 3.25. While stirring each liquid at 24,000 rpm using a high-speed mixer, 15 g of medium-chain triglyceride (octanoic acid/decanoic acid triglyceride: O.D.O.) was added, and each liquid was well-mixed for 1 minute. The resulting mixture liquids were homogenized twice at a pressure of 50 MPa using a collision-type generator, thereby preparing emulsions (Comparative Test samples 1-1 to 1-4).

(4) Measurement Results

Table 2 shows the water-insoluble component production amount in a sugar beet pectin aqueous dispersion, the weight average molecular weight ($M_w$) and root mean square radius of gyration ($R_g$) of sugar beet pectin, the median particle diameters immediately after the preparation of the emulsion and after three-day preservation at 60° C., and the proportion of oil droplet particles having a particle diameter of 1 μm or greater among all of the droplet particles in the emulsion.

the constituents of the sugar beet pectin are polymerized, thereby making the sugar beet pectin hydrophobic; therefore,

TABLE 2

| Sugar beet pectin | Water-insoluble production (%) | SEC-MALLS measurement | | Emulsion | Immediately after emulsification | | After 3-day preservation at 60° C. | |
|---|---|---|---|---|---|---|---|---|
| | | $M_w$ (mol/g) | $R_g$ (nm) | | Median particle diameter (μm) | 1 μm or more (%) | Median particle diameter (μm) | 1 μm or more (%) |
| Example 1 | 5.4 | $7.52 \times 10^5$ | 50.1 | Test sample 1-1 | 0.631 | 5.556 | 2.036 | 12.031 |
| Example 2 | 10.2 | $8.05 \times 10^5$ | 50.0 | Test sample 1-2 | 0.610 | 5.203 | 1.506 | 10.032 |
| Example 3 | 35.6 | $1.12 \times 10^6$ | 64.1 | Test sample 1-3 | 0.567 | 4.321 | 0.995 | 6.943 |
| Example 4 | 16.9 | $8.78 \times 10^5$ | 56.9 | Test sample 1-4 | 0.596 | 5.111 | 1.217 | 9.150 |
| Example 5 | 46.7 | $1.46 \times 10^6$ | 68.3 | Test sample 1-5 | 0.510 | 3.456 | 0.852 | 6.418 |
| Example 6 | 20.7 | $1.00 \times 10^6$ | 75.1 | Test sample 1-6 | 0.585 | 4.513 | 1.002 | 7.013 |
| Example 7 | 60.4 | $1.54 \times 10^6$ | 63.7 | Test sample 1-7 | 0.510 | 3.545 | 0.753 | 5.865 |
| Comparative Example 1 | 0.0 | $5.23 \times 10^5$ | 45.4 | Comparative Test sample 1-1 | 0.654 | 18.110 | 2.343 | 18.110 |
| Comparative Example 2 | 0.0 | $3.83 \times 10^5$ | 37.9 | Comparative Test sample 1-1 | 0.651 | 5.666 | 2.358 | 16.432 |
| Comparative Example 3 | 0.0 | $4.54 \times 10^5$ | 42.1 | Comparative Test sample 1-1 | 0.716 | 6.918 | 3.518 | 24.332 |
| Comparative Example 4 | 0.0 | $5.16 \times 10^5$ | 49.9 | Comparative Test sample 1-1 | 0.616 | 5.370 | 2.289 | 12.656 |

The sugar beet pectins (modified products 1 to 7) of Examples 1 to 7 all contained water-insoluble components (hydrogel components), and showed a tendency for the hydrogel production amount to increase as the modification time (heating time) increases. In contrast, none of the unmodified sugar beet pectins (unmodified products 1 to 4) of Comparative Examples 1 to 4 contained water-insoluble components (hydrogel components).

Moreover, all of the modified sugar beet pectins (modified products 1 to 7) of Examples 1 to 7 had weight average molecular weights ($M_w$) greater than $6.5 \times 10^5$ g/mol, and showed a tendency for the weight average molecular weight to increase as the heating time increases. In contrast, all of the unmodified sugar beet pectins (unmodified products 1 to 4) of Comparative Examples 1 to 4 had weight average molecular weights ($M_w$) of less than $6.5 \times 10^5$ g/mol. This showed that the modified sugar beet pectin has a higher molecular weight than the unmodified sugar beet pectin.

Moreover, the median particle diameters of the oil droplet particles in the emulsions prepared using the modified sugar beet pectins of Examples 1 to 7 were smaller than the median particle diameters of the emulsions prepared using the unmodified sugar beet pectins of Comparative Examples 1 to 4. This tendency was particularly significant in the median particle diameters of the oil droplet particles in the emulsion after the three-day preservation at 60° C., which had emulsion stability. This proved that the modifications of sugar beet pectins according to the method of Examples 1 to 7 enable preparation of a pectin that has emulsifying properties and particularly excellent emulsion stability.

Test Example 2

Median Particle Diameter of Water-Insoluble Particles Contained in Sugar Beet Pectin Dispersion The median particle diameter (μm) of the water-insoluble particles contained in a sugar beet pectin dispersion was measured as follows. The sugar beet pectin is modified by heating an aqueous dispersion of the sugar beet pectin so that the modified sugar beet pectin is detected as water-insoluble particles of a predetermined sized, as a water-insoluble particles absorb water.

Method for Measuring Volume Median Particle Diameter

After individually adding 0.45 g (dry weight) each of the sugar beet pectins of Examples 1 to 7 and Comparative Examples 1 to 4 to 150 g of ion-exchanged water, each mixture was stirred at 26,000 rpm for 1 minute using a polythoron mixer, thereby preparing about 0.3% each of aqueous dispersions of sugar beet pectins. Each aqueous dispersion was further diluted 100-fold with ion-exchanged water (the last concentration of sugar beet pectin=about 0.003%) (Test samples 1 to 7, Comparative Test samples 1 to 4). Each liquid was treated with a SALD-2100 laser light-scattering spectrometry (product of Shimadzu Corp.) so as to measure the median particle diameter (μm) of the water-insoluble particles. Table 3 shows the results.

TABLE 3

| Sugar beet pectin Dispersion | Sugar beet pectin | Volume median particle diameter (μm) |
|---|---|---|
| Test sample 2-1 | Example 1 | 2.484 |
| Test sample 2-2 | Example 2 | 5.401 |
| Test sample 2-3 | Example 3 | 11.443 |
| Test sample 2-4 | Example 4 | 6.431 |
| Test sample 2-5 | Example 5 | 16.112 |
| Test sample 2-6 | Example 6 | 9.410 |
| Test sample 2-7 | Example 7 | 16.772 |
| Comparative Test sample 2-1 | Comparative Example 1 | 0.304 |
| Comparative Test sample 2-2 | Comparative Example 2 | 0.278 |
| Comparative Test sample 2-3 | Comparative Example 3 | 0.261 |
| Comparative Test sample 2-4 | Comparative Example 4 | 0.281 |

When the sugar beet pectins were about 0.003% aqueous dispersions, each of the modified sugar beet pectins of Examples 1 to 7 had a volume median particle diameter of 1 μm or greater. In contrast, each of the unmodified sugar beet pectins of Comparative Examples 1 to 4 had a volume median particle diameter of 0.35 μm or less. The "volume median particle diameter of 0.35 μm or less" corresponds to the volume median particle diameter of general commercially available sugar beet pectins. The results showed that the modifications of sugar beet pectins according to the methods of Examples 1 to 7 enable preparation of a polymeric sugar beet pectin having a greater volume median particle diameter.

Example 3

Emulsifying Properties of Modified Sugar Beet Pectin

Using the modified and unmodified sugar beet pectin of Examples 1 to 7 and Comparative Examples 1 to 4, emulsions were prepared as follows (Test samples 3-1 to 3-7, Comparative Test samples 3-1 to 3-3). Each emulsion was evaluated for emulsifying properties and emulsion stability with the method below.
(1) Preparation of Emulsion
(1-1) Test Sample 3-1

2 g (dry weight) of the modified sugar beet pectin (modified product 1) of Example 1 was added to 68 g of ion-exchanged water, and the pH was adjusted to 3.25 by a citric acid aqueous solution. While stirring the mixture at 24,000 rpm using a high-speed mixer, 30 g of orange oil (product of H. N. Fusgaard A/S; same hereunder) adjusted to a specific gravity of about 0.95 g/ml using ester gum (product of Tic Gums, Inc.; same hereunder) was added to the mixture, followed by mixing for 1 minute. This mixture liquid was homogenized twice at a pressure of 20 MPa using a collision-type generator, thereby preparing an emulsion (Test sample 3-1).
(1-2) Test Samples 3-2 to 3-4

2 g (dry weight) each of the modified sugar beet pectins of Examples 2, 4 and 6 were individually added to 83 g of ion-exchanged water, and a citric acid aqueous solution was added to each liquid to adjust the pH to 3.25. While stirring each dispersion at 24,000 rpm using a high-speed mixer, 15 g of coffee flavor oil (product of J. Manheimer, Inc.; same hereunder) adjusted to a specific gravity of about 0.931 g/ml was added thereto. The mixture liquids were homogenized twice at a pressure of 35 MPa using a collision-type generator, thereby preparing emulsions (Test samples 3-2 to 3-4).
(1-3) Test Samples 3-5 to 3-7

2 g (dry weight) each of the modified sugar beet pectins of Examples 3, 5 and 7 were individually added to 75.5 g of ion-exchanged water, and a citric acid aqueous solution was added to each liquid to adjust the pH to 3.25. A mixture (specific gravity=0.911 g/ml) of 15 g of medium-chain triglyceride (O.D.O.: octanoic acid/decanoic acid triglycerides) and 7.5 g of d-limonene (product of Wako Pure Chemical Ind., Ltd.; same hereunder) was added to each mixture under stirring at 24,000 rpm using a high-speed mixer, followed by mixing for 1 minute. The mixture liquids were homogenized twice at a pressure of 50 MPa using a collision-type generator, thereby preparing emulsions (Test samples 3-5 to 3-7).
(1-4) Comparative Test Sample 3-1

2 g (dry weight) of the unmodified sugar beet pectin of Comparative Example 1 was added to 68 g of ion-exchanged water, and a citric acid aqueous solution was added to adjust the pH to 3.25. While stirring the dispersion at 24,000 rpm using a high-speed mixer, 30 g of orange oil adjusted to a specific gravity of about 0.95 g/ml using ester gum was added to the dispersion, followed by mixing for 1 minute. This mixture liquid was homogenized twice at a pressure of 20 MPa using a collision-type generator, thereby preparing an emulsion.
(1-5) Comparative Test Sample 3-2

2 g (dry weight) of the unmodified sugar beet pectin of Comparative Example 1 (unmodified product 1) was dispersed in 83 g of ion-exchanged water, and a citric acid aqueous solution was added to adjust the pH to 3.25. While stirring the dispersion at 24,000 rpm using a high-speed mixer, 15 g of coffee flavor oil having a specific gravity of 0.931 g/ml was added to the dispersion, followed by mixing for 1 minute. This mixture liquid was homogenized twice at a pressure of 35 MPa using a collision-type generator, thereby preparing an emulsion.
(1-6) Comparative Test Sample 3-3

2 g (dry weight) of the unmodified sugar beet pectin of Comparative Example 1 (unmodified product 1) was dispersed in 73.5 g of ion-exchanged water, and a citric acid aqueous solution was added to adjust the pH to 3.25. A mixture (specific gravity=0.91 g/ml) of 15 g of medium-chain triglyceride (O.D.O.: octanoic acid and decanoic acid triglycerides) and 7.5 g of d-limonene was added to the above mixture under stirring at 24,000 rpm using a high-speed mixer, followed by mixing for 1 minute. This mixture liquid was homogenized twice at a pressure of 50 MPa using a collision-type generator, thereby preparing an emulsion.
(2) Evaluation of Emulsifying Properties of Emulsion and Emulsion Stability of Emulsion After Preservation For each of the emulsions obtained above, the median particle diameter immediately after the emulsification and after three-day preservation at 60° C., and the proportion of oil droplet particles having a particle diameter of 1 μm or greater among all of the droplet particles in the emulsion were measured with a SALD-2100 laser diffraction light-scattering particle size analyzer (product of Shimadzu Corp.). A smaller median particle diameter of the oil droplets and a smaller amount of oil droplets having 1 μm or greater indicates a more stable emulsification state. Table 4 shows the results.

TABLE 4

| Emulsion | Sugar beet pectin used | Oil type (oil content) Emulsification pressure | Immediately after emulsification | | After 3-day preservation at 60° C. | |
|---|---|---|---|---|---|---|
| | | | Median particle diameter (μm) | 1 μm or more (%) | Median particle diameter (μm) | 1 μm or more (%) |
| Test sample 3-1 | Example 1 | Orange oil + ester gum (30%) 20 Mpa × 2 | 0.446 | 2.517 | 0.545 | 3.326 |

TABLE 4-continued

| Emulsion | Sugar beet pectin used | Oil type (oil content) Emulsification pressure | Immediately after emulsification | | After 3-day preservation at 60° C. | |
|---|---|---|---|---|---|---|
| | | | Median particle diameter (μm) | 1 μm or more (%) | Median particle diameter (μm) | 1 μm or more (%) |
| Test sample 3-2 | Example 2 | Coffee oil (15%) | 0.689 | 5.050 | 0.801 | 5.303 |
| Test sample 3-3 | Example 3 | 35 Mpa × 2 | 0.701 | 5.164 | 0.858 | 5.500 |
| Test sample 3-4 | Example 4 | | 0.627 | 5.016 | 0.787 | 5.262 |
| Test sample 3-5 | Example 5 | O.D.O. + d-limonene | 0.508 | 3.549 | 0.854 | 5.466 |
| Test sample 3-6 | Example 6 | (22.5%) 50 Mpa × 2 | 0.513 | 3.849 | 0.956 | 5.763 |
| Test sample 3-7 | Example 7 | | 0.525 | 3.498 | 0.952 | 5.553 |
| Comparative Test sample 3-1 | Comparative Example 1 | Orange oil + ester gum (30%) 20 Mpa × 2 | 0.494 | 2.875 | 0.825 | 6.146 |
| Comparative Test sample 3-2 | Comparative Example 1 | Coffee oil (15%) 35 Mpa × 2 | 0.756 | 6.513 | 2.016 | 15.452 |
| Comparative Test sample 3-3 | Comparative Example 1 | O.D.O. + d-limonene (22.5%) 50 Mpa × 2 | 0.611 | 4.614 | 1.974 | 12.119 |

Comparisons between Test samples 3-1 and Comparative Test samples 3-1; between Test samples 3-2 to 3-4 and Comparative Test samples 3-2; and between Test samples 3-5 to 3-7 and Comparative Test samples 3-3 showed that, for the emulsions prepared using the modified sugar beet pectin of Examples 1 to 7, the median particle diameters of the oil droplet particles immediately after emulsification and after three-day preservation at 60° C. were small and the proportion of oil droplet particles having a median particle diameter of 1 μm or greater was low irrespective of the type of oil components, compared with those prepared from the unmodified sugar beet pectin of Comparative Example 1. This tendency was particularly remarkable after three-day preservation at 60° C.

The results show that the use of modified sugar beet pectin enables the preparation of an emulsion having high emulsifying properties and emulsion stability even from oil that cannot be emulsified by unmodified pectin (starting material).

Examples 8 to 16

Modified Sugar Beet Pectin (Modified Products 8 to 16)

Sugar beet pectins (starting materials) were individually dispersed in ion-exchanged water according to the proportions shown in Table 5 using a KitchenAid Mixer KSM5. Each dispersion was contained in an airtight container, and heated by an SH-641 thermostatic chamber (Table 5). The heating was performed at 60 to 90° C. for 5 to 24 hours. After the heating, the mixture was freeze-dried using an FDU-1100 freeze-drying unit, followed by pulverization in a mortar to obtain powdery modified sugar beet pectin (modified products 8-16).

Examples 17 to 19

Modified Sugar Beet Pectins (Modified Products 17 to 19)

Sugar beet pectins (starting materials) were individually dispersed in ion-exchanged water according to the proportions shown in Table 5 using a KitchenAid Mixer KSM5. After placing each dispersion in a recovery flask, the dispersion was heated under reduced pressure (700 hPa) using an N-1000V rotary evaporator system (Table 5). The heating was performed at 75-90° C. for 5 to 12 hours. After the heating, each mixture was freeze-dried using an FDU-1100 freeze-drying unit, followed by pulverization in a mortar to obtain powdery modified sugar beet pectin (modified products 17-19).

Comparative Example 5

Unmodified Sugar Beet Pectin (Unmodified Product 5)

The powdery sugar beet pectin (starting material) used for the preparations of the modified sugar beet pectins of Examples 8 to 19 was used in unmodified form (unmodified product 5).

Comparative Example 6

Sugar Beet Pectin Freeze-Dried Without Being Heated after Dispersed in Water

Powdery sugar beet pectins (starting materials) were individually dispersed in ion-exchanged water according to the proportions shown in Table 5 using a KitchenAid Mixer KSM5. Each mixture was freeze-dried using an FDU-1100 freeze-drying unit without being heated, followed by pulverization in a mortar to obtain powdery modified sugar beet pectin.

TABLE 5

| | Mixing ratio (mass ratio) (Pectin (starting material):water) | Temperature (° C.) | Time (hour) | Equipments | Pressure |
|---|---|---|---|---|---|
| Example 8 | 20:80 | 75 | 5 | Thermostatic chamber | Ordinary pressure |
| Example 9 | 20:80 | 75 | 12 | Thermostatic chamber | Ordinary pressure |
| Example 10 | 20:80 | 75 | 18 | Thermostatic chamber | Ordinary pressure |
| Example 11 | 20:80 | 75 | 24 | Thermostatic chamber | Ordinary pressure |
| Example 12 | 20:80 | 60 | 24 | Thermostatic chamber | Ordinary pressure |
| Example 13 | 20:80 | 80 | 8 | Thermostatic chamber | Ordinary pressure |
| Example 14 | 20:80 | 90 | 5 | Thermostatic chamber | Ordinary pressure |
| Example 15 | 10:90 | 75 | 12 | Thermostatic chamber | Ordinary pressure |
| Example 16 | 35:65 | 75 | 12 | Thermostatic chamber | Ordinary pressure |
| Example 17 | 20:80 | 75 | 12 | Evaporator | Reduced pressure |
| Example 18 | 20:80 | 80 | 8 | Evaporator | Reduced pressure |
| Example 19 | 20:80 | 90 | 5 | Evaporator | Reduced pressure |
| Comparative Example 5 | Starting material powder | — | — | — | |
| Comparative Example 6 | 20:80 | — | — | — | |

Test Example 4

Evaluation of Emulsifying Properties and Emulsion Stability (1)

The sugar beet pectins prepared in Examples 8 to 19 and those prepared in Comparative Examples 5 to 9 were individually processed into emulsions according to the following methods (Test samples 4-1 to 4-12, Comparative Test samples 4-1 to 4-5). The obtained emulsions were evaluated in terms of emulsifying properties and emulsion stability.
(1) Preparation of Emulsion
(1-1) Test Samples 4-1 to 4-12

2 g (dry weight) each of the modified sugar beet pectins prepared in Examples 8 to 19 were individually dispersed in 73.5 g of ion-exchanged water. After adding 1 g of 10% sodium benzoate aqueous solution, a 10% citric acid aqueous solution was added to adjust the pH to 3.25. A mixture (specific gravity=about 0.91 g/ml) of 15 g of medium-chain triglyceride (O.D.O.) and 7.5 g of d-limonene was added to each dispersion under stirring at 24,000 rpm using a high-speed mixer, followed by mixing for 1 minute. The resulting mixture liquids were homogenized twice at a pressure of 50 MPa using a collision-type generator, thereby preparing emulsions (Test samples 4-1 to 4-12).
(1-2) Comparative Test Samples 4-1 to 4-5

2 g (dry weight) each of the modified sugar beet pectins prepared in Comparative Examples 5-9 were individually dispersed in 73.5 g of ion-exchanged water. After adding 1 g of 10% sodium benzoate aqueous solution, a 10% citric acid aqueous solution (about 1 g) was added to adjust the pH to 3.25. A mixture (specific gravity=about 0.91 g/ml) of 15 g of medium-chain triglyceride (O.D.O.) and 7.5 g of d-limonene was added to each dispersion under stirring at 24,000 rpm using a high-speed mixer, followed by mixing for 1 minute. The resulting mixture liquids were homogenized twice at a pressure of 50 MPa using a collision-type generator, thereby preparing emulsions (Comparative Test samples 4-1 to 4-5).
(2) Evaluation of Emulsion For each of the emulsions obtained above, the median particle diameters immediately after the emulsification and after three-day preservation at 60° C., and the proportion of oil droplet particles having a particle diameter of 1 μm or greater among all of the droplet particles in the emulsion were measured using a SALD-2100 laser diffraction light-scattering particle-size analyzer.

TABLE 6

| | | | Immediately after emulsification | | After 3-day preservation at 60° C. | |
|---|---|---|---|---|---|---|
| Emulsion | | Sugar beet pectin used (sugar beet pectin, 2.0%) | particle diameter (μm) | 1 μm or more (%) | particle diameter (μm) | 1 μm or more (%) |
| Test sample 4-1 | Example 8 | Sugar beet pectin (starting material):water = 20:80 75° C., 5 hours, Thermostatic chamber | 0.499 | 3.330 | 1.215 | 7.835 |

TABLE 6-continued

| Emulsion | | Sugar beet pectin used (sugar beet pectin, 2.0%) | Immediately after emulsification | | After 3-day preservation at 60° C. | |
|---|---|---|---|---|---|---|
| | | | particle diameter (μm) | 1 μm or more (%) | particle diameter (μm) | 1 μm or more (%) |
| Test sample 4-2 | Example 9 | Sugar beet pectin (starting material):water = 20:80 75° C., 12 hours, Thermostatic chamber | 0.508 | 3.549 | 0.854 | 5.466 |
| Test sample 4-3 | Example 10 | Sugar beet pectin (starting material):water = 20:80 75° C., 18 hours, Thermostatic chamber | 0.562 | 4.126 | 1.154 | 8.712 |
| Test sample 4-4 | Example 11 | Sugar beet pectin (starting material):water = 20:80 75° C., 24 hours, Thermostatic chamber | 0.683 | 4.816 | 1.560 | 9.612 |
| Test sample 4-5 | Example 12 | Sugar beet pectin (starting material):water = 20:80 60° C., 24 hours, Thermostatic chamber | 0.512 | 3.635 | 0.998 | 5.986 |
| Test sample 4-6 | Example 13 | Sugar beet pectin (starting material):water = 20:80 80° C., 8 hours, Thermostatic chamber | 0.558 | 4.320 | 1.110 | 6.232 |
| Test sample 4-7 | Example 14 | Sugar beet pectin (starting material):water = 20:80 90° C., 5 hours, Thermostatic chamber | 0.525 | 3.498 | 0.952 | 5.553 |
| Test sample 4-8 | Example 15 | Sugar beet pectin (starting material):water = 10:90 75° C., 12 hours, Thermostatic chamber | 0.565 | 3.936 | 0.987 | 5.864 |
| Test sample 4-9 | Example 16 | Sugar beet pectin (starting material):water = 35:65 75° C., 12 hours, Thermostatic chamber | 0.600 | 4.010 | 1.217 | 8.165 |
| Test sample 4-10 | Example 17 | Sugar beet pectin (starting material):water = 20:80 75° C., 12 hours, Evaporator | 0.513 | 3.849 | 0.956 | 5.763 |
| Test sample 4-11 | Example 18 | Sugar beet pectin (starting material):water = 20:80 80° C., 8 hours, Evaporator | 0.555 | 4.251 | 1.111 | 7.513 |
| Test sample 4-12 | Example 19 | Sugar beet pectin (starting material):water = 20:80 90° C., 5 hours, Evaporator | 0.565 | 3.812 | 1.255 | 8.846 |
| Comparative Test sample 4-1 | Comparative Example 1 | Sugar beet pectin (starting material) powder Unmodified | 0.611 | 4.614 | 1.974 | 12.119 |
| Comparative Test sample 4-2 | Comparative Example 5 | Sugar beet pectin:water = 20:80 Unmodified | 0.656 | 6.311 | 2.073 | 14.410 |

In all of the emulsions except for the emulsion of Test Example 4-4, the volume median particle diameter of the oil droplet particles immediately after emulsification was smaller than that of the emulsion (Comparative Example 4-1) prepared using the unmodified sugar beet pectin (starting material); and the proportion of oil droplet particles having a particle diameter of 1 µm or greater was also low. On the other hand, in the emulsion (Comparative Test sample 4-2) prepared using the sugar beet pectin (Comparative Example 6) obtained by freeze-drying the aqueous dispersion without heating, the volume median particle diameter of oil droplet particles was larger than that of the emulsion (Comparative Example 4-1) prepared using the unmodified sugar beet pectin (starting material); and the proportion of the oil droplet particles having a particle diameter of 1 µm or greater was also high. Moreover, although the volume median particle diameter of oil droplet particles was increased remarkably from about 0.6 µm to about 2 µm after three-day preservation at 60° C. for Comparative Test sample 4-1, the increase in volume median particle diameter of oil droplet particles was suppressed in Test samples 4-1 to 4-12. The proportion of oil droplet particles having a particle diameter of 1 µm or greater was also remarkably increased from about 5% (immediately after emulsification) to about 12% (after three-day preservation at 60° C.) for Comparative Test samples 4-1; however, the increase was suppressed in Test samples 4-1 to 4-12. Particularly, in Test samples 4-2, 4-5, 4-7, 4-8, and 4-10, the volume median particle diameter of the oil droplet particles after three-day preservation at 60° C. was below 1 µm, showing that the emulsion stability was significantly increased.

In contrast, in Test sample 4-2, which was freeze-dried without being heated, it was revealed that the particle diameter of oil droplets after three-day preservation at 60° C. and the proportion of oil droplet particles having a particle diameter of 1 µm or greater were similar to those in Comparative Test sample 4-1; or, at the very least, the emulsion stability was significantly decreased.

Test Example 5

Evaluation of Emulsifying Properties and Emulsion Stability (2)

Using the sugar beet pectins of Examples 8 and 9 and Comparative Example 5, emulsions were prepared using the following various oil components. The emulsions were evaluated in terms of emulsifying properties and emulsion stability.
(1) Preparation of Emulsion
(1-1) Test Sample 5-1
2 g (dry weight) of the modified sugar beet pectin prepared in Example 8 was dispersed in 66 g of ion-exchanged water. After adding 1 g of 10% sodium benzoate aqueous solution, a 10% citric acid aqueous solution was added to adjust the pH to 3.25. While stirring the dispersion at 24,000 rpm using a high-speed mixer, 30 g of orange oil adjusted to a specific gravity of about 0.95 g/ml using ester gum was added to the dispersion, followed by mixing for 1 minute. This mixture liquid was homogenized twice at a pressure of 20 MPa using a collision-type generator, thereby preparing an emulsion (Test sample 5-1).
(1-2) Test Sample 5-2
2 g (dry weight) of the modified sugar beet pectin prepared in Example 9 was dispersed in 73.5 g of ion-exchanged water. After adding 1 g of 10% sodium benzoate aqueous solution, a 10% citric acid aqueous solution was added to adjust the pH to 3.25. A mixture (specific gravity=about 0.91 g/ml) of 15 g of medium-chain triglyceride (O.D.O.) and 7.5 g of orange oil was added to the dispersion under stirring at 24,000 rpm using a high-speed mixer, followed by mixing for 1 minute. This mixture liquid was homogenized twice at a pressure of 50 MPa using a collision-type generator, thereby preparing an emulsion (Experiment samples 5-2).
(1-3) Experiment Sample 5-3
2 g (dry weight) of the modified sugar beet pectin prepared in Example 8 was dispersed in 81 g of ion-exchanged water. After adding 1 g of 10% sodium benzoate aqueous solution, a 10% citric acid aqueous solution was added to adjust the pH to 3.25. While stirring the dispersion at 24,000 rpm using a high-speed mixer, 15 g of coffee flavor oil having a specific gravity of 0.931 g/ml was added to the dispersion, followed by mixing for 1 minute. This mixture liquid was homogenized twice at a pressure of 35 MPa using a collision-type generator, thereby preparing an emulsion (Test sample 5-3).
(1-4) Experiment Sample 5-4
2 g (dry weight) of the modified sugar beet pectin prepared in Example 9 was dispersed in 81 g of ion-exchanged water. After adding 1 g of 10% sodium benzoate aqueous solution, a 10% citric acid aqueous solution was added to adjust the pH to 3.25. While stirring the dispersion at 24,000 rpm using a high-speed mixer, 15 g of refined soybean oil (product of Fuji Oil Co., Ltd.; same hereunder) having a specific gravity of about 0.91 g/ml was added to the dispersion, followed by mixing for 1 minute. This mixture liquid was homogenized twice at a pressure of 50 MPa using a collision-type generator, thereby preparing an emulsion (Test sample 5-4).
(1-5) Comparative Test Sample 5-1
2 g (dry weight) of the sugar beet pectin (starting material: unmodified product 5) prepared in Comparative Example 5 was dispersed in 66 g of ion-exchanged water. After adding 1 g of 10% sodium benzoate aqueous solution, a 10% citric acid aqueous solution was added to adjust the pH to 3.25. While stirring the dispersion at 24,000 rpm using a high-speed mixer, 30 g of orange oil adjusted to a specific gravity of about 0.95 g/ml using ester gum was added to the dispersion, followed by mixing for 1 minute. This mixture liquid was homogenized twice at a pressure of 20 MPa using a collision-type generator, thereby preparing an emulsion (Comparative Test sample 5-1).
(1-6) Comparative Test Sample 5-2
2 g (dry weight) of the sugar beet pectin (starting material: unmodified product 5) prepared in Comparative Example 5 was dispersed in 73.5 g of ion-exchanged water. After adding 1 g of 10% sodium benzoate aqueous solution, a 10% citric acid aqueous solution was added to adjust the pH to 3.25. A mixture (specific gravity=0.906 g/ml) of 15 g of medium-chain triglyceride (O.D.O.) and 7.5 g of orange oil was added to the dispersion under stirring at 24,000 rpm using a high-speed mixer, followed by mixing for 1 minute. This mixture liquid was homogenized twice at a pressure of 50 MPa using a collision-type generator, thereby preparing an emulsion (Comparative Test sample 5-2).
(1-7) Comparative Test Sample 5-3
2 g (dry weight) of the modified sugar beet pectin (starting material: unmodified product 5) prepared in Comparative Example 5 was dispersed in 81 g of ion-exchanged water. After adding 1 g of 10% sodium benzoate aqueous solution, a 10% citric acid aqueous solution was added to adjust the pH to 3.25. While stirring the dispersion at 24,000 rpm using a high-speed mixer, 15 g of coffee flavor oil having a specific gravity of about 0.93 g/ml was added to the dispersion, followed by mixing for 1 minute. This mixture liquid was homogenized twice at a pressure of 35 MPa using a collision-type generator, thereby preparing an emulsion (Comparative Test sample 5-3).

(1-8) Comparative Test Sample 5-4

2 g (dry weight) of the modified sugar beet pectin (starting material: unmodified product 5) prepared in Comparative Example 5 was dispersed in 81 g of ion-exchanged water. After adding 1 g of 10% sodium benzoate aqueous solution, a 10% citric acid aqueous solution was added to adjust the pH to 3.25. While stirring the dispersion at 24,000 rpm using a high-speed mixer, 15 g of refined soybean having a specific gravity of about 0.91 g/ml was added to the dispersion, followed by mixing for 1 minute. This mixture liquid was homogenized twice at a pressure of 50 MPa using a collision-type generator, thereby preparing an emulsion (Comparative Test sample 5-4).

(2) Evaluation of Emulsion

For each emulsion prepared above, the emulsifying properties and emulsion stability were evaluated by the same method as in Experiment 4. Table 7 shows the results.

proportion of oil droplet particles having a median particle diameter of 1 μm or greater at the time immediately after emulsification, the change (increase) with time, i.e., the change after three-day preservation at 60° C., was significantly small in the former samples (Test samples 5-1 to 5-4) compared with Comparative Test samples 5-1 to 5-4. Specifically, the former samples were superior in emulsion stability. This tendency was seen regardless of the kind of oil, and was particularly remarkable in Test samples 5-2 and 5-4.

The results showed that the use of modified sugar beet pectin enables preparation of an emulsion having high emulsifying properties and emulsion stability even from oil that cannot be emulsified by unmodified pectin (starting material). All of the oils used in the present experiment are selected from oils widely used in the food industry. Accordingly, the modified sugar beet pectin of the present invention can be adapted for a wide variety of foods.

Test Example 6

The Stability Test of Emulsion in Drink

The emulsions prepared using the modified sugar beet pectins of the present invention were incorporated in a drink, and the stability of each emulsion in the drink was examined.

TABLE 7

| Emulsion | Sugar beet pectin used | Oil type (Oil content) | Immediately after emulsification | | After 3-day preservation at 60° C. | |
|---|---|---|---|---|---|---|
| | | | Median particle diameter (μm) | 1 μm or more (%) | Median particle diameter (μm) | 1 μm or more (%) |
| Test sample 5-1 | Example 8 | Orange oil + ester gum (30%) | 0.451 | 2.721 | 0.502 | 3.133 |
| Comparative Test sample 5-1 | Comparative Example 5 | Orange oil + ester gum (30%) | 0.494 | 2.875 | 0.825 | 6.146 |
| Test sample 5-2 | Example 9 | Orange oil + O.D.O. (22.5%) | 0.555 | 4.238 | 0.917 | 7.540 |
| Comparative Test sample 5-2 | Comparative Example 5 | Orange oil + O.D.O. (22.5%) | 0.505 | 3.864 | 2.469 | 21.408 |
| Test sample 5-3 | Example 8 | Coffee flavor oil (15%) | 0.689 | 5.550 | 0.801 | 5.003 |
| Comparative Test sample 5-3 | Comparative Example 5 | Coffee flavor oil (15%) | 0.756 | 6.513 | 2.016 | 15.452 |
| Test sample 5-4 | Example 9 | Refined soybean oil (15%) | 0.583 | 4.235 | 0.888 | 6.992 |
| Comparative Test sample 5-4 | Comparative Example 5 | Refined soybean oil (15%) | 0.611 | 4.446 | 4.440 | 38.913 |

A comparison of the emulsions (Test samples 5-1 to 5-4) prepared using modified sugar beet pectins and the emulsions (Comparative Test samples 5-1 to 5-4) prepared using unmodified sugar beet pectins (starting material) revealed that although there was no significant difference in the volume median particle diameter of oil droplet particles and the (1) Preparation of Drink (1-1) Test Sample 6-1

1.5 g of 20% sodium benzoate aqueous solution and 0.5 g of the emulsion of Test sample 5-2 were added to 120 g of syrup having a sugar content of 55%. The mixture was stirred for 10 minutes at 2,000 rpm using a propeller stirrer. After adjusting the pH to 3.3 using a 50% citric acid aqueous solution, the solution weight was adjusted to 125 g using ion-exchanged water. The mixture was further stirred for 60 minutes at 2,000 rpm using a propeller stirrer, thereby preparing a syrup emulsion. 250 g of carbonated mineral water (product of Suntory, same hereunder) was poured into a 300 ml plastic bottle, and 50 g of the above syrup emulsion was added thereto. The plastic bottle was slowly inverted 10 times so as to gently stir the mixture inside, thereby preparing a drink.

(1-2) Comparative Test Sample 6-1

1.5 g of 20% sodium benzoate aqueous solution and 0.5 g of the emulsion of Comparative Test sample 5-2 were added to 120 g of syrup having a sugar content of 55%. The mixture was stirred for 10 minutes at 2,000 rpm using a propeller stirrer. After adjusting the pH to 3.3 using a 50% citric acid aqueous solution and adjusting the solution weight to 125 g using ion-exchanged water, the mixture was stirred with a propeller stirrer for 60 minutes at 2,000 rpm, thereby preparing a syrup emulsion. 250 g of carbonated mineral water was poured into a 300 ml plastic bottle, and 50 g of the above syrup emulsion was added thereto. The plastic bottle was slowly inverted 10 times so as to gently stir the mixture inside, thereby preparing a drink.

(2) Evaluation of Stability of Drink

The stability of the drink was evaluated based on its appearance immediately after preparation and after seven-day preservation at 40° C. Table 8 shows the results.

TABLE 8

| Drink stability | Immediately after preparation | After 7-day preservation at 40° C. |
|---|---|---|
| Test sample 6-1 | The whole is homogeneously cloudy. Creaming[1], shitasuki[2], oil floating[3], etc. cannot be observed. | The whole is homogeneously cloudy. Creaming[1], shitasuki[2], oil floating[3], etc. cannot be observed. (No change is observed in the sample immediately after preparation.) |
| Comparative Test sample 6-1 | The whole is homogeneously cloudy. Creaming[1], shitasuki[2], oil floating[4], etc. cannot be observed. | Creaming occurs near the liquid surface, and a neck ring can be observed. Shitasuki is observed in the lower portion of the bottle. |

[1]Creaming: A phenomenon in which oil droplet particles float up to the upper portion of a container, i.e., near the surface. This phenomenon occurs when oil droplet particles are coalesced with each other or agglomerated, and enlarged; and the effects of specific gravity difference with the continuous phase (the water phase in the Examples) in the system are increased. Creaming easily occurs when oil droplet particles have a particle diameter of 1 μm or more.
[2]Shitasuki: A phenomenon in which the oil droplet particles are disproportionated to the upper portion of the container due to creaming, and the proportion of the dispersed phase is reduced in the lower portion of the container, making the lower portion of the container transparent.
[3]Oil floating: An oily film may be formed in the upper portion of a beverage even when oil droplet particles are not coagulated. This is called "oil floating". Oil floating is differentiated from "creaming", in which the entire oil phase floats up.
[4]Neck ring: A phenomenon in which the particles float up to the upper portion of the container due to creaming, and form a layered ring structure.

As shown in Table 8, the drink (Test sample 6-1) containing the emulsion prepared using the modified sugar beet pectin had significantly superior stability compared with the drink (Comparative Test sample 6-1) containing the emulsion prepared using the unmodified sugar beet pectin (starting material). The results show that the modified sugar beet pectin of the present invention is effective for improving the stability of emulsion (emulsifying composition) in drink.

Test Example 7

Stability Test of Emulsion in Drink (1) Preparation of Emulsion

Sample emulsion were prepared according to the formulations shown in Table 9 using the modified sugar beet pectin prepared in Example 7 as an emulsifier (Test samples 7-1 to 7-3). Further, comparative sample emulsions were prepared using the unmodified sugar beet pectin (starting material: unmodified product 1) of Comparative Example 1 or gum arabic instead of modified sugar beet pectin (Comparative Test samples 7-1 to 7-9). For reference, an emulsion that does not contain d-limonene as an oil phase component was also prepared (Reference Test samples 7-1 to 7-3).

The gum arabic was a powdered gum arabic sample (gum arabic HA, product of San-Ei Gen F.F.I., Inc.: unmodified product) having a molecular weight of about 800,000 and a drying loss of about 12%.

TABLE 9

(wt %)

| | Test sample | | | Comparative Test sample | | | | | | | | | Reference Test sample | | |
|---|---|---|---|---|---|---|---|---|---|---|---|---|---|---|---|
| | 7-1 | 7-2 | 7-3 | 7-1 | 7-2 | 7-3 | 7-4 | 7-5 | 7-6 | 7-7 | 7-8 | 7-9 | 7-1 | 7-2 | 7-3 |
| Modified sugar beet pectin | 2.0 | 2.0 | 2.0 | — | — | — | — | — | — | 2.0 | — | — | 2.0 | — | — |
| Sugar beet pectin (starting material) | — | — | — | 2.0 | 2.0 | 2.0 | — | — | — | — | 2.0 | — | — | 2.0 | — |
| Gum arabic | — | — | — | — | — | — | 15.0 | 15.0 | 15.0 | — | — | 15.0 | — | — | 15.0 |
| d-limonene | 7.5 | 7.5 | 7.5 | 7.5 | 7.5 | 7.5 | 7.5 | 7.5 | 7.5 | 7.5 | 7.5 | 7.5 | — | — | — |
| O.D.O. | 7.5 | 15.0 | 22.5 | 7.5 | 15.0 | 22.5 | 7.5 | 15.0 | 22.5 | — | — | — | 15.0 | 15.0 | 15.0 |
| 10% Sodium benzoate | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| 10% Citric acid | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ion-exchanged water | 81.0 | 73.5 | 66.0 | 81.0 | 73.5 | 66.0 | 68.0 | 60.5 | 53.0 | 88.5 | 88.5 | 75.5 | 81.0 | 81.0 | 68.0 |
| Total amount | 100 | 100 | 100 | 100 | 100 | 100 | 100 | 100 | 100 | 100 | 100 | 100 | 100 | 100 | 100 |

(1-1) Preparation of Test Samples 7-1 to 7-3 and Comparative Test Samples 7-1 to 7-3

2 g (dry weight) of the modified sugar beet pectin prepared in Example 7 or the unmodified sugar beet pectin (starting material) of Comparative Example 1 was dispersed in ion-exchanged water. After adding 1 g of a 10% sodium benzoate aqueous solution, a 10% citric acid aqueous solution was added to adjust the pH to 3.25. A mixture of medium-chain triglyceride (O.D.O.) and 7.5 g of d-limonene (each having a specific gravity of 0.89 g/ml or greater) was added to the dispersion under stirring at 24,000 rpm using a high-speed mixer, followed by mixing for 1 minute. This mixture liquid was homogenized twice at a pressure of 50 MPa using a collision-type generator, thereby preparing an emulsion (Test samples 7-1 to 7-3, Comparative Test samples 7-1 to 7-3).

(1-2) Preparation of Comparative Test Samples 7-4 to 7-6

15 g (dry weight) of gum arabic was dispersed in ion-exchanged water. After adding 1 g of a 10% sodium benzoate aqueous solution, a 10% citric acid aqueous solution was added to adjust the pH to 3.25. A mixture of medium-chain triglyceride (O.D.O.) and 7.5 g of d-limonene as terpene (each have a specific gravity of 0.89 g/ml or greater) was added to the dispersion under stirring at 24,000 rpm using a high-speed mixer, followed by mixing for 1 minute. This mixture liquid was homogenized twice at a pressure of 50 MPa using a collision-type generator, thereby preparing an emulsion (Comparative Test samples 7-4 to 7-6).

(1-3) Comparative Test Samples 7-7 to 7-9

2 g of the modified sugar beet pectin prepared in Example 7, 2 g of the sugar beet pectin (starting material) of Comparative Example 1, or 15 g of gum arabic (all are dry weights) was dispersed in ion-exchanged water. After adding 1 g of a 10% sodium benzoate aqueous solution, a 10% citric acid aqueous solution was added to adjust the pH to 3.25. While stirring the dispersion at 24,000 rpm using a high-speed mixer, a mixture of 7.5 g of d-limonene (specific gravity 0.85 g/ml) was added, followed by mixing for 1 minute. This mixture liquid was homogenized twice at a pressure of 50 MPa using a collision-type generator, thereby preparing an emulsion (Comparative Test samples 7-7 to 7-9).

(1-4) Reference Test Samples 7-1 to 7-3

2 g of the modified sugar beet pectin prepared in Example 7, 2 g of the sugar beet pectin (starting material), or 15 g of gum arabic (all are dry weights) was dispersed in ion-exchanged water. After adding 1 g of a 10% sodium benzoate aqueous solution, a 10% citric acid aqueous solution (about 1 g) was added to adjust the pH to 3.25. A mixture of 15 g of medium-chain triglyceride (O.D.O.) (specific gravity=0.95 g/ml) was added to the dispersion under stirring at 24,000 rpm using a high-speed mixer, followed by mixing for 1 minute. This mixture liquid was homogenized twice at a pressure of 50 MPa using a collision-type generator, thereby preparing an emulsion (Reference Test samples 7-1 to 7-3).

(2) Evaluation of Emulsion

For each of the emulsions obtained above, the median particle diameters immediately after the emulsification and after thirty-day preservation at 20° C., and the proportion of oil droplet particles having a particle diameter of 1 μm or greater among all of the droplet particles in the emulsion were measured using a laser diffraction light-scattering particle-size analyzer SALD-2100 (product of Shimadzu Corp.). Tables 10 and 11 show the results. Tables 10 and 11 also show the contents (%) of the oil phase, and the specific gravities (g/ml) of the oil phase and the aqueous phase with regard to the emulsions of Test samples 7-1 to 7-3 and Comparative Test samples 7-1 to 7-9.

TABLE 10

| | | Test sample | | | Reference Test sample | | |
|---|---|---|---|---|---|---|---|
| | | 7-1 | 7-2 | 7-3 | 7-1 | 7-2 | 7-3 |
| Properties of emulsion | Oil phase content (%) | 15.0 | 22.5 | 30.0 | 15.0 | 15.0 | 15.0 |
| | Specific gravity of water phase (g/ml) | 1.015 | 1.015 | 1.015 | 1.015 | 1.015 | 1.084 |
| | Specific gravity of oil phase (g/ml) | 0.892 | 0.912 | 0.929 | 0.952 | 0.952 | 0.952 |
| Immediately after emulsification | Median particle diameter (μm) | 0.518 | 0.530 | 0.588 | 0.520 | 0.588 | 0.574 |
| | 1 μm or more (%) | 2.044 | 2.300 | 2.819 | 2.222 | 2.877 | 2.653 |
| After 30-day preservation at 20° C. | Median particle diameter (μm) | 0.783 | 0.716 | 1.376 | 0.714 | 1.563 | 0.723 |
| | 1 μm or more (%) | 7.149 | 6.648 | 11.482 | 6.548 | 14.484 | 7.006 |

TABLE 11

| | | Comparative Example | | | | | | | | |
|---|---|---|---|---|---|---|---|---|---|---|
| | | 7-1 | 7-2 | 7-3 | 7-4 | 7-5 | 7-6 | 7-7 | 7-8 | 7-9 |
| Properties of emulsion | Oil phase content (%) | 15.0 | 22.5 | 30.0 | 15.0 | 22.5 | 30.0 | 7.5 | 7.5 | 7.5 |
| | Specific gravity of water phase (g/ml) | 1.015 | 1.015 | 1.015 | 1.084 | 1.084 | 1.084 | 1.015 | 1.015 | 1.084 |

TABLE 11-continued

|  |  | Comparative Example | | | | | | | | |
|---|---|---|---|---|---|---|---|---|---|---|
|  |  | 7-1 | 7-2 | 7-3 | 7-4 | 7-5 | 7-6 | 7-7 | 7-8 | 7-9 |
|  | Specific gravity of oil phase (g/ml) | 0.892 | 0.912 | 0.929 | 0.892 | 0.912 | 0.929 | 0.847 | 0.847 | 0.847 |
| Immediately after emulsification | Median particle diameter (μm) | 0.611 | 0.891 | 0.927 | 0.871 | 0.960 | 1.207 | 5.133 | 6.173 | 8.144 |
|  | 1 μm or more (%) | 5.883 | 8.621 | 9.492 | 14.711 | 9.015 | 12.894 | 51.226 | 62.481 | 72.905 |
| After 30-day preservation at 20° C. | Median particle diameter (μm) | 2.178 | 2.591 | 4.153 | 1.282 | 2.951 | 49.715 | n.m.* | n.m.* | n.m.* |
|  | 1 μm or more (%) | 14.976 | 20.614 | 41.982 | 10.750 | 26.634 | 84.772 | n.m.* | n.m.* | n.m.* |

*n.m. indicates that, because the oil and water phases were completely separated, the particle size could not be measured.

As shown in the tables, when only fatty acid triglyceride was used as an oil phase component without using d-limonene (Reference Test samples 7-1 to 7-3), the median particle diameter of the oil droplet particles in the emulsion immediately after emulsification was 0.5 to 0.6 μm in all samples. On the other hand, after thirty-day preservation at 20° C., although the particle diameter of the oil droplet particles of the emulsion (Reference Test sample 7-2) using an unmodified sugar beet pectin (starting material) as an emulsifier was increased to about 1.6 μm, the median particle diameter of the oil droplet particles of the emulsions (Reference Test samples 7-1 and 7-3) prepared using a modified sugar beet pectin and gum arabic were 1.0 μm or less; that is, they showed a high emulsion stability.

The emulsions using terpene (d-limonene) and fatty acid triglyceride as oil phase components and also using a modified sugar beet pectin as an emulsifier (Test samples 7-1 to 7-3) had a smaller median particle diameter of the oil droplet particles immediately after emulsification than the emulsions (Comparative Test samples 7-1 to 7-3, 7-4 to 7-6) prepared using the unmodified sugar beet pectin (starting material) or gum arabic as an emulsifier; and the proportion of oil droplet particles having a particle diameter of 1 μm or greater was also low. In the unmodified sugar beet pectin or gum arabic, there is a tendency for the particle diameter of oil droplet particles to increase as the oil phase content increases. In contrast, the modified sugar beet pectin did not have such a tendency. Accordingly, the modified sugar beet pectin was confirmed to be effective in the preparation of an emulsion containing a large amount of an oil phase. Although the median particle diameter of the oil droplet particles after thirty-day preservation at 20° C. was slightly larger in Test sample 7-3, the increase in particle size was very small in Test samples 7-1 and 7-2, in which the particle diameters were both within 1 μm. On the other hand, the increase in particle size was significant in Comparative Test samples 7-1 to 7-3, showing that the emulsion prepared from the unmodified sugar beet pectin (starting material) had low emulsion stability. In the emulsion prepared using gum arabic, although the increase in particle size was small in Comparative Test sample 7-4, it was significant in Comparative Test samples 7-5 and 7-6 having high oil phase contents in which the increase was even higher than those in the emulsion prepared using the unmodified sugar beet pectin (starting material).

In addition, none of the emulsions that do not contain O.D.O. in the oil phases (Comparative Test samples 7-7 to 7-9) had the uniform and small oil droplet particles.

The result showed that the emulsion prepared using the modified sugar beet pectin as an emulsifier had a small median particle diameter of oil droplet particles even when the content of oil phase was relatively high; therefore, the emulsion was stable.

Experiment 8: Preparation of Concentrated Drink

According to the formulation of Table 12, concentrated drinks (Test samples 8-1 to 8-3, Comparative Test sample 8-1 to 8-6) were prepared using the emulsions (Test samples 7-1 to 7-3 and Comparative Test samples 7-1 to 7-6) prepared in Experiment 7.

TABLE 12

|  |  | Test sample | | | Comparative Test sample (wt %) | | | | | |
|---|---|---|---|---|---|---|---|---|---|---|
|  |  | 8-1 | 8-2 | 8-3 | 8-1 | 8-2 | 8-3 | 8-4 | 8-5 | 8-6 |
| Emulsion | Test sample 7-1 | 1.5 | — | — | — | — | — | — | — | — |
|  | Test sample 7-2 | — | 1.5 | — | — | — | — | — | — | — |
|  | Test sample 7-3 | — | — | 1.5 | — | — | — | — | — | — |
|  | Comparative Test sample 7-1 | — | — | — | 1.5 | — | — | — | — | — |
|  | Comparative Test sample 7-2 | — | — | — | — | 1.5 | — | — | — | — |
|  | Comparative Test sample 7-3 | — | — | — | — | — | 1.5 | — | — | — |

TABLE 12-continued

|  | Test sample | | | Comparative Test sample | | | | | | (wt %) |
|---|---|---|---|---|---|---|---|---|---|---|
|  | 8-1 | 8-2 | 8-3 | 8-1 | 8-2 | 8-3 | 8-4 | 8-5 | 8-6 | |
| Comparative Test sample 7-4 | — | — | — | — | — | — | 1.5 | — | — | |
| Comparative Test sample 7-5 | — | — | — | — | — | — | — | 1.5 | — | |
| Comparative Test sample 7-6 | — | — | — | — | — | — | — | — | 1.5 | |
| Syrup (FE55%, Brix75) | 126.0 | 126.0 | 126.0 | 126.0 | 126.0 | 126.0 | 126.0 | 126.0 | 126.0 | |
| 10% Sodium benzoate | 2.0 | 2.0 | 2.0 | 2.0 | 2.0 | 2.0 | 2.0 | 2.0 | 2.0 | |
| 50% Citric acid | 2.5 | 2.5 | 2.5 | 2.5 | 2.5 | 2.5 | 2.5 | 2.5 | 2.5 | |
| Total amount | 132.0 | 132.0 | 132.0 | 132.0 | 132.0 | 132.0 | 132.0 | 132.0 | 132.0 | |

2 g of a 10% sodium benzoate aqueous solution and 1.5 g each of emulsions of Test samples 7-1 to 7-3 or Comparative Test samples 7-1 to 7-6 were added to 126 g of Brix75 syrup, and the mixture was stirred for 10 minutes at 2,000 rpm using a propeller stirrer. After adjusting the pH to 3.3 using 2.5 g of a 50% citric acid aqueous solution, the solution weight was adjusted to 132 g using ion-exchanged water. Thereafter, the mixture was stirred for 60 minutes at 2,000 rpm using a propeller stirrer, thereby preparing a concentrated drink. After preparing the concentrated drink, the drink was stored at 20° C. for 3, 7, and 30 days, and the appearance at each stage was evaluated. Table 13 shows the evaluation results. Table 13 also shows the contents of the oil phase (%) and the specific gravities (g/ml) of the oil phase and the aqueous phase with regard to the concentrated drinks of Test samples 8-1 to 8-3 and Comparative Test samples 8-1 to 8-6.

not affect the commodity value as long as it is around SLR level.

n: Floating oil phase or neck ring were not observed.
SLR: A very small amount of floating oil phase was observed.
LR: A very thin ring was observed.
MR: An intermediate-level neck ring was observed.
SR: An apparent neck ring was observed.

Evaluation of precipitation was stated using the following symbols. n is the highest evaluation, and EP is the lowest.

n: Precipitation was not observed.
SP: A very small amount of precipitation was observed.
BP: Apparent precipitation was observed.

After the seventh day of the preservation at 20° C., neck ring and precipitation were not observed in any of the concentrated drinks (Test samples 8-1 to 8-3) prepared using the modified sugar beet pectin. Moreover, after the 30th day of

TABLE 13

|  |  | Test sample | | | Comparative Test sample | | | | | | (wt %) |
|---|---|---|---|---|---|---|---|---|---|---|---|
|  |  | 8-1 | 8-2 | 8-3 | 8-1 | 8-2 | 8-3 | 8-4 | 8-5 | 8-6 | |
| Oil phase/water phase of emulsion | Oil phase content (%) | 0.18 | 0.27 | 0.36 | 0.18 | 0.27 | 0.36 | 0.18 | 0.27 | 0.36 | |
|  | Specific gravity of water phase (g/ml) | 1.378 | 1.378 | 1.378 | 1.378 | 1.378 | 1.378 | 1.378 | 1.378 | 1.378 | |
|  | Specific gravity of oil phase (g/ml) | 0.892 | 0.912 | 0.929 | 0.892 | 0.912 | 0.929 | 0.892 | 0.912 | 0.929 | |
| Standing at 20° C. for 3 days | Neck ring[1] | n | n | n | n | n | n | n | n | n | |
|  | Precipitate[2] | n | n | n | n | n | n | n | n | n | |
| Standing at 20° C. for 7 days | Neck ring[1] | n | n | n | n | n | SLR | SLR | SLR | LR | |
|  | Precipitate[2] | n | n | n | n | n | n | n | n | SP | |
| Standing at 20° C. for 30 days | Neck ring[1] | n | n | SLR | SLR | SLR | LR | SLR | LR | MR | |
|  | Precipitate[2] | n | n | n | n | n | n | n | SP | SP | |

[1]Neck ring: A phenomenon in which oil droplet particles float up to the upper portion of a container, and form a layered ring structure. This phenomenon occurs when oil droplet particles are coalesced with each other or agglomerated, and enlarged; and effects of specific gravity difference with the continuous phase (the water phase in the Examples) in the system is increased. Floating up easily occurs when particles have a particle diameter of 1 μm or more.
[2]Precipitate: A phenomenon in which a component dissolved in the water phase or oil phase, or a component adsorbed to the water phase or oil phase is, for example, crystallized during storage, and thereby is laminated on the bottom of the container. This phenomenon may also occur when the specific gravity of the oil phase becomes larger than that of the water phase.

In Table 13, the evaluation of the neck ring was stated using the following symbols. "n" is the highest evaluation, and SR is the lowest. Even if the floating oil phase is observed, it does the preservation, a very small amount of floating oil phase was observed in Test sample 8-3 containing a high amount of oil phase; however, sedimentation was still not observed.

More specifically, there was almost no change in the appearance of the concentrated drinks prepared using modified sugar beet pectins throughout the thirty-day preservation period.

On the other hand, in the concentrated drinks prepared using the unmodified sugar beet pectins (starting material) (Comparative Test samples 8-1 to 8-3), all samples had floating oil phases after the 30th day of the preservation at 20° C. Moreover, neck ring formation was confirmed in Comparative Test sample 8-3 containing a high amount of oil phase. Further, in the concentrated drinks (Comparative Test samples 8-4 to 8-6) prepared using gum arabic, the change in the appearance was more significant; all samples had floating oil phases after the seventh day of the preservation at 20° C.; and after 30th day, neck ring formation was confirmed in Comparative Test samples 8-5 and 8-6.

The results showed that the use of modified sugar beet pectin enables preparation of a concentrated drink with stability superior to those prepared using the unmodified sugar beet pectin or gum arabic, which is a polysaccharide emulsifier most commonly used for drinks.

Test Example 9

Preparation of Drink

According to the formulation of Table 14, drinks (Test samples 9-1 to 9-3, Comparative Test samples 9-1 to 9-6) were prepared using the concentrated drinks (Test samples 8-1 to 8-3 and Comparative Test samples 8-1 to 8-6) prepared in Test Example 8.

TABLE 14

|  |  | Test sample | | | Comparative Test sample | | | | | | (wt %) |
|---|---|---|---|---|---|---|---|---|---|---|---|
|  |  | 9-1 | 9-2 | 9-3 | 9-1 | 9-2 | 9-3 | 9-4 | 9-5 | 9-6 |  |
| concentrated drink | Test sample 8-1 | 35.0 | | | | | | | | | |
|  | Test sample 8-2 | | 35.0 | | | | | | | | |
|  | Test sample 8-3 | | | 35.0 | | | | | | | |
|  | Comparative Test sample 8-1 | | | | 35.0 | | | | | | |
|  | Comparative Test sample 8-2 | | | | | 35.0 | | | | | |
|  | Comparative Test sample 8-3 | | | | | | 35.0 | | | | |
|  | Comparative Test sample 8-4 | | | | | | | 35.0 | | | |
|  | Comparative Test sample 8-5 | | | | | | | | 35.0 | | |
|  | Comparative Test sample 8-6 | | | | | | | | | 35.0 | |
|  | Carbonated mineral water | 165.0 | 165.0 | 165.0 | 165.0 | 165.0 | 165.0 | 165.0 | 165.0 | 165.0 | |
|  | Total amount | 200.0 | 200.0 | 200.0 | 200.0 | 200.0 | 200.0 | 200.0 | 200.0 | 200.0 | |

35 g each of Test samples 8-1 to 8-3 or Comparative Test samples 8-1 to 8-6 were individually placed in a 200 ml plastic bottle, 165 g of carbonated mineral water was added to each bottle, and each bottle was closed tightly with a cap. The plastic bottles were slowly inverted 10 times so as to gently stir the mixtures inside, thereby preparing drinks.

After preparing the drinks, each drink was allowed to stand for 3, 7 and 30 days, and their appearances at each stage were evaluated. Table 15 shows the results.

TABLE 15

|  | Test sample | | | Comparative Test sample | | | | | |
|---|---|---|---|---|---|---|---|---|---|
|  | 9-1 | 9-2 | 9-3 | 9-1 | 9-2 | 9-3 | 9-4 | 9-5 | 9-6 |
| Oil phase content (%) | 0.031 | 0.047 | 0.063 | 0.031 | 0.047 | 0.063 | 0.031 | 0.047 | 0.063 |
| Specific gravity of water phase (g/ml) | 1.153 | 1.153 | 1.153 | 1.153 | 1.153 | 1.153 | 1.153 | 1.153 | 1.153 |

TABLE 15-continued

|  |  | Test sample | | | Comparative Test sample | | | | | |
| --- | --- | --- | --- | --- | --- | --- | --- | --- | --- | --- |
|  |  | 9-1 | 9-2 | 9-3 | 9-1 | 9-2 | 9-3 | 9-4 | 9-5 | 9-6 |
|  | Specific gravity of oil phase (g/ml) | 0.892 | 0.912 | 0.929 | 0.892 | 0.912 | 0.929 | 0.892 | 0.912 | 0.929 |
| Preserved at 20° C. for 3 days | Neck ring | n | n | n | SLR | SLR | LR | LSR | LR | LR |
|  | Precipitate | n | n | n | n | n | n | n | n | n |
| Preserved at 20° C. for 7 days | Neck ring | SLR | n | SLR | LR | LR | MR | LR | MR | MR |
|  | Precipitate | n | n | n | n | n | n | n | n | SP |
| Preserved at 20° C. for 30 days | Neck ring | LR | n | SLR | MR | MR | SR | MR | SR | SR |
|  | Precipitate | n | n | SP | SP | SP | SP | SP | SP | BP |

See Table 13 for the descriptions of the "neck ring" and "precipitate", and the evaluation symbols.

In Test samples 9-1 to 9-3, neck ring formation or sedimentation was not observed in all conditions after the third day of the preservation at 20° C. In Test samples 9-1 to 9-3, a slight amount of floating oil phase was observed on the seventh day of the preservation. Further, a thin oil phase was observed after 30 days in Test sample 9-1. However, such oil phase formation was insignificant to an extent that it did not impair the product value. For Test sample 9-2 having an oil phase with a specific gravity of 0.912 g/ml, there was no change in the appearance even after the thirty-day preservation.

In contrast, in Comparative Test samples 9-1 to 9-3 prepared using the unmodified sugar beet pectin (starting material) as an emulsifier, the floating oil was observed in the liquid surfaces of all drinks after the third day of the preservation. After the seventh day, neck rings were observed in all samples. Moreover, in Comparative Test samples 9-5 and 9-6 prepared using gum arabic, neck rings were observed after the third day of the preservation. After the seventh day, neck rings were observed in all samples of Comparative Test samples 9-4 to 9-6.

The results showed that the modified sugar beet pectin improves not only the stability of the concentrated drink but also the stability of the beverage product. The difference between the Examples and Comparative Examples tends to be more significant in the beverage product, in which the specific gravity of the aqueous phase is closer to that of the oil phase than that of the concentrated drink. This is presumably because the particle movement speed is high in the beverage product whose viscosity is lower than that of the concentrated drink.

The invention claimed is:

1. Modified sugar beet pectin comprising a water-insoluble component, the water-insoluble component absorbing water to form a hydrogel, when the modified sugar beet pectin is dispersed in water at 25° C. to a final concentration of 0.1 mass %,
   wherein the modified sugar beet pectin has a volume median particle diameter of 1 to 30 µm, as measured in the form of a 0.003 mass % aqueous dispersion thereof using a laser diffraction light-scattering particle size analyzer,
   wherein the modified sugar beet pectin has a weight average molecular weight of at least $6.5 \times 10^5$ g/mol, as determined by homogenizing a 1.5 mass % aqueous dispersion of the modified sugar beet pectin at a pressure of 50 MPa and subjecting the homogenized dispersion to size-exclusion chromatography coupled with a multi-angle light-scattering detector and a refractive index detector, and
   wherein the modified sugar beet pectin has a root mean square radius of gyration of at least 50 nm, as determined by homogenizing a 1.5 mass % aqueous dispersion of the modified sugar beet pectin at a pressure of 50 MPa and subjecting the homogenized dispersion to size-exclusion chromatography coupled with a multi-angle light-scattering detector and a refractive index detector.

2. The modified sugar beet pectin according to claim 1, which contains the water-insoluble component in an amount of at least 3 mass % and less than 90 mass %.

3. The modified sugar beet pectin according to claim 1 or 2 prepared by heating an aqueous dispersion of sugar beet pectin.

* * * * *